(12) United States Patent
Divakaran et al.

(10) Patent No.: US 6,778,708 B1
(45) Date of Patent: Aug. 17, 2004

(54) COMPRESSED BIT-STREAM SEGMENT IDENTIFICATION AND DESCRIPTOR

(75) Inventors: Ajay Divakaran, Scotch Plains, NJ (US); Huifang Sun, Cranbury, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/345,452

(22) Filed: Jul. 1, 1999

Related U.S. Application Data

(63) Continuation-in-part of application No. 09/236,838, filed on Jan. 25, 1999.

(51) Int. Cl.$^7$ .............................. G06K 9/46; H04N 5/14

(52) U.S. Cl. ..................... 382/236; 382/238; 382/245; 348/699

(58) Field of Search ................................ 382/235, 236, 382/232, 239, 245, 238, 246, 247; 348/700, 699, 394.1; 325/240.25, 240.26

(56) References Cited

U.S. PATENT DOCUMENTS 5,687,095 A * 11/1997 Haskell et al. ........... 348/386.1

FOREIGN PATENT DOCUMENTS

EP 0806866 11/1997 ............ H04N/5/14

OTHER PUBLICATIONS

A Bit Allocation Based Descriptor for MPEG–4/2/1 Compressed Video Sequences, Divakaran et al., Submission to MPEG–7, Lancaster, U.K. Feb. 1999.

Compressed–domain Techniques for Image/Video Indexing and Manipulation, S.F. Chang, IEEE International Conference on Image Processing, vol. 1, pp. 314–317, Washington, DC, Oct. 1995.

(List continued on next page.)

Primary Examiner—Leo Boudreau
Assistant Examiner—Duy M. Dang
(74) Attorney, Agent, or Firm—Dirk Brinkman; Andrew J. Curtin

(57) ABSTRACT

A compressed bit-stream represents a corresponding sequence having intra-coded frames and inter-coded frames. The compressed bit-stream includes bits associated with each of the inter-coded frames representing a displacement from the associated inter-coded frame to a closest matching of the intra-coded frames. A magnitude of the displacement of a first of the inter-coded frames is determined based on the bits in the compressed bit-stream associated with that inter-coded frame. The inter-coded frame is then identified based on the determined displacement magnitude. The inter-coded frame includes macro-blocks. Each macro-block is associated with a respective portion of the inter-coded frame bits which represent the displacement from that macro-block to the closest matching intra-coded frame. The displacement magnitude is an average of the displacement magnitudes of all the macro-blocks associated with the inter-coded frame. The displacement magnitudes of those macro-blocks which are less than the average displacement magnitude are set to zero. The number of run lengths of the zero magnitude macro-blocks is determined and also used to identify the first inter-coded frame.

21 Claims, 22 Drawing Sheets

OTHER PUBLICATIONS

Scene Change Detection and Feature Extraction for MPEG–4 Sequences, Divakaran et al., Proceedings SPIE Conference on Storage and Retrieval for Image and Video Databases, San Jose, Jan. 1999.

Scene Change Detection Algorithm for MPEG Video Sequences, IEEE International Conference on Image Processing, vol. 2, pp. 821–824, Lausanne, Switzerland, Sep. 16–19 1996.

Developing High–level Representations of Video Clips Using Videotrails, Kobla et al., Proceedings SPIE conference on Storage and Retrieval for Image and Video Databases, San Jose, Jan. 1996.

A Compressed Video Editing and Parsing System, CVEPS, Meng et al., ACM Multimedia Conference, Boston MA Nov. 1996.

Texture Information in Run–length Matrices, Xiaou Tang, IEEE Transactions on Image Processing, vol. 7, No. 11, pp. 1602–1609, Nov. 1998.

Extracting Image Features From MPEG–2 Compressed Stream, Won et al. Proceedings SPIE conference on Storage and Retrieval for Image and Video Databases, San Jose, Jan. 1998.

Rapid Scene Analysis on Compressed Videos, Yeo et al., IEEE Transactions on Circuits and Systems for Video Technology, vol. 5, pp. 533–544, Dec. 1995.

Video Parsing and Browsing Using Compressed Data, Zhang et al., Multimedia Tools and Applications, vol 1, Mar. 1995.

Detection Fade–in/out Scene Changes in the MPEG–1/2/4 Compressed Domain, Divakaran et al., Submitted to Storage and Retrieval from Media Databases, 2000.

Spatio–temporal Video Search Using the Object Based Video Representation, Zhong et al., IEEE International Conference on Image Processing, vol. 1, pp. 21–24, Santa Barbara, California, Oct. 26–29 1997.

Ardizzone, et al.; "Video Indexing Using MPEG Motion Compression Vectors"; Proceedings from IEEE International Conference of Multimedia Computing and Systems, Jun. 1999. Pp. 725–729.

Won et al.; "Extracting Image Features from MPEG–2 Compressed Stream"; Proceedings of the SPIE, Jan. 1998, pp. 426–435.

Kobla, et al., "Extraction of Features for Indexing MPEG– Compressed Video"; IEEE First Workshop on Multimedia Signal Processing, Proceedings of the First Signal Processing Society Workshop on Multiedia Signal Progressing, Jun., 1997. Pp. 337–342.

Kobla, et al.; "Indexing and Retrieval of the MPEG Compressed Video"; Journal of Electronic Imaging. vol. 7, No. 2. Apr., 1998. Pp. 294–307.

* cited by examiner $$710 \left\{ \begin{matrix} X_1 & X_5 & X_9 & X_{13} \\ X_2 & X_6 & X_{10} & X_{14} \\ X_3 & X_7 & X_{11} & X_{15} \\ X_4 & X_8 & X_{12} & X_{16} \end{matrix} \right\} C_{mv}$$

$$720 \left\{ \begin{matrix} Y_1 & Y_5 & Y_9 & Y_{13} \\ Y_2 & Y_6 & Y_{10} & Y_{14} \\ Y_3 & Y_7 & Y_{11} & Y_{15} \\ Y_4 & Y_8 & Y_{12} & Y_{16} \end{matrix} \right\} C_{res}$$

$$730 \left\{ \begin{matrix} 0 & 0 & 0 & 0 \\ 0 & 0 & 0 & 0 \\ 0 & 0 & 0 & 0 \\ 0 & 0 & 0 & 0 \end{matrix} \right\} C_{mv}$$

$$740 \left\{ \begin{matrix} Y_1' & Y_5' & Y_9' & Y_{13}' \\ Y_2' & Y_6' & Y_{10}' & Y_{14}' \\ Y_3' & Y_7' & Y_{11}' & Y_{15}' \\ Y_4' & Y_8' & Y_{12}' & Y_{16}' \end{matrix} \right\} C_{res}$$

| Sequence | Object | VOP Size in MB's | $C^{avg}_{mv}$ | $C^{avg}_{res}$ | QP | $N_o$ | Most common run-length range | Frequency of most common run-length average |
|---|---|---|---|---|---|---|---|---|
| News | Still Background | 11x9 | 0.2 | 2.28 | 3 | 89 | Long | 3 |
| News | TV Monitor with Dancer Sequence | 6x5 | 11.43 | 193.5 | 3 | 18 | Short | 3 |
| News | Newsreaders | 11x7 | 1.1 | 42.19 | 3 | 30 | Short | 4 |
| News | Text Overlay | 3x2 | 0.0 | 0.0 | 3 | 6 | Long | 1 |
| | | | | | | | | |
| Coast-Guard (CG) | Water | 11x6 | 5.48 | 41.5 | 3 | 51 | Long | 4 |
| CG | Motor Launch | 9x5 | 2.00 | 35.6 | 3 | 23 | Long | 2 |
| CG | Small Motorboat and Wake | 11x1 | 4.00 | 63.8 | 3 | 8 | Long | 3 |
| CG | Panned Background | 11x4 | 2.86 | 51.0 | 3 | 36 | Medium | 4 |
| | | | | | | | | |
| Container Ship (CS) | Water | 11x8 | 0.85 | 5.46 | 6 | 58 | Short | 10 |
| CS | Ship | 9x4 | 1.16 | 46.13 | 6 | 15 | Long | 4 |
| CS | Small Boat | 4x1 | 0.8 | 16.4 | 6 | 3 | Long | 1 |
| CS | Foreground (Flagpole) | 11x9 | 0.12 | 1.79 | 6 | 90 | Long | 4 |
| CS | Still Bgd. (Sky) | 11x3 | 0.4 | 2.09 | 6 | 29 | Long | 2 |
| CS | Flag | 1x1 | 2 | 97 | 6 | 0 | N/A | 0 |
| | | | | | | | | |
| Akiyo | Still Background | 11x9 | 0.22 | 2.93 | 4 | 89 | Long | 3 |
| Akiyo | Head and Shoulders | 9x8 | 1.77 | 35.5 | 4 | 37 | Short | 5 |

Figure 13

COMPRESSED BIT-STREAM SEGMENT IDENTIFICATION AND DESCRIPTOR

CROSS-REFERENCE TO RELATED APPLICATIONS

This application is a Continuation-in-Part of pending U.S. patent application Ser. No. 09/236,838, filed Jan. 25, 1999, entitled "METHODS OF FEATURE EXTRACTION OF VIDEO SEQUENCES";

FIELD OF THE INVENTION

The present invention relates generally to identifying information in a compressed bit-stream and more particularly to identifying a desired segment of a compressed bit-stream. The invention is particularly suitable for use in identify a desired frame or shot in an encoded video sequence, such as a high definition television (HDTV) broadcast signal or other compressed form of video information as might be communicated via the INTERNET or other communications network.

BACKGROUND DESCRIPTION

Basic standards for compressing the bandwidth of digital color video signals have been adopted by the Motion Picture Experts Group (MPEG). The MPEG standards achieve high data compression rates by developing information for a full frame of the image only every so often. The full image frames, i.e. intra-coded frames, are often referred to as "I-frames" or "anchor frames", and contain full frame information independent of any other frames. Image difference frames, i.e. inter-coded frames, are often referred to as "B-frames" and "P-frames", or as "predictive frames", and are encoded between the I-frames and reflect only image differences i.e. residues, with respect to the reference frame.

Typically, each frame of a video sequence is partitioned into smaller blocks of picture element, i.e. pixel, data. Each block is subjected to a discrete cosine transformation (DCT) function to convert the statistically dependent spatial domain pixels into independent frequency domain DCT coefficients. Respective 8×8 or 16×16 blocks of pixels, referred to as macro-blocks, are subjected to the DCT function to provide the coded signal. The DCT coefficients are usually energy concentrated so that only a few of the coefficients in a macro-block contain the main part of the picture information. For example, if a macro-block contains an edge boundary of an object, the energy in that block after transformation, i.e. as represented by the DCT coefficients, includes a relatively large DC coefficient and randomly distributed AC coefficients throughout the matrix of coefficients. A non-edge macro-block, on the other hand, is usually characterized by a similarly large DC coefficient and a few adjacent AC coefficients which are substantially larger than other coefficients associated with that block. The DCT coefficients are typically subjected to adaptive quantization, and then are run-length and variable-length encoded for the transmission medium. Thus, the macro-blocks of transmitted data typically include fewer than an 8×8 matrix of codewords.

The macro-blocks of inter-coded frame data, i.e. encoded P or B frame data, include DCT coefficients which represent only the differences between a predicted pixels and the actual pixels in the macro-block. Macro-blocks of intra-coded and inter-coded frame data also include information such as the level of quantization employed, a macro-block address or location indicator, and a macro-block type. The latter information is often referred to as "header" or "overhead" information.

Each P frame is predicted from the lastmost occurring I or P frame. Each B frame is predicted from an I or P frame between which it is disposed. The predictive coding process involves generating displacement vectors, often referred to as "motion vectors", which indicate the magnitude of the displacement to the macro-block of an I frame most closely matches the macro-block of the B or P frame currently being coded. The pixel data of the matched block in the I frame is subtracted, on a pixel-by-pixel basis, from the block of the P or B frame being encoded, to develop the residues.

The transformed residues and the vectors form part of the encoded data for the P and B frames.

With the advent of new digital video services, such as video distribution on the INTERNET, there is an increasing need for signal processing techniques for identifying information in video sequences. For example, identification of scene changes, whether they are abrupt or gradual, and of features or characteristics of a scene are useful for the purposes of indexing image changes so that scenes of interest may be automatically and easily identified. In the future, a significantly greater amount of digital video material will be provided in the form of compressed or encoded data. Operating on the video sequence information in its compressed form, rather than in its decompressed or decoded form, where possible, will permit more rapid processing because of the reduction in data size and processing steps. Hence, a need exists for techniques which permit operating directly on compressed data, rather than having to perform full frame decompression before operating on the data.

Previous work in feature extraction for video indexing from compressed data has primarily emphasized DC coefficient extraction. In a paper entitled "Rapid Scene Analysis on Compressed Video", IEEE Transactions on Circuits and Systems for Video Technology, Vol. 5, No. 6, December 1995, page 533–544, Yeo and Liu describe an approach to scene change detection in the MPEG-2 compressed video domain. The authors also review earlier efforts at detecting scene changes based on sequences of entire uncompressed image data, and various compressed video processing techniques of others. Yeo and Liu introduced the use of spatially reduced versions of the original images, so-called DC images, and DC sequences extracted from compressed video to facilitate scene analysis operations. Their "DC image" is made up of pixels which are the average value of the pixels in a block of the original image and the DC sequence is the combination of the reduced number of pixels of the DC image. It should be noted that the DC image extraction based technique is good for I-frames since the extraction of the DC values from I-frames is relatively simple. However, for other type frames, additional computation is needed.

Won et al, in a paper published in Proc. SPEE Conf. on Storage and Retrieval for Image and Video Databases, January 1998, describe a method of extracting features from compressed MPEG-2 video by making use of the bits expended on the DC coefficients to locate edges in the frames. However, their work is limited to I-frames only. Kobla et al describe a method in the same Proceedings using the DC image extraction of Yeo et al to form video trails that characterize the video clips. Feng et al (IEEE International Conference on Image Processing, Vol. 11, pp. 821–824, Sept. 16–19, 1996), use the bit allocation across the macro-blocks of MPEG-2 frames to detect abrupt scene changes, without extracting DC images. Feng et al's technique is computationally the simplest since it does not require significant computation beyond that required for parsing the compressed bit-stream.

In accordance with prior work of the present inventors and a co-worker, which is described in previously filed, commonly owned co-pending U.S. Patent applications entitled "Methods of scene change detection and fade detection for indexing of video sequences" (application Ser. No. 09/231,698, filed Jan. 14, 1999), "Methods of scene fade detection for indexing of video sequences" (application Ser. No. 09/231,699, filed Jan. 14, 1999), "Methods of Feature Extraction for Video Sequences (aplication Ser. No. 09/236,838, Jan. 25, 1999), computationally simple techniques have been devised which build on certain aspects of Feng et al's approach and Yeo et al's approach to give accurate and simple scene change detection. Once a suspected scene or object change has been accurately located in a group of consecutive frames by use of a DC image extraction based technique, application of an appropriate bit allocation-based technique and/or an appropriate DC residual coefficient processing technique to P or B-frame information in the vicinity of the located scene quickly and accurately locates the cut point. This combined method is applicable to either MPEG-2 frame sequences or MPEG-4 multiple object sequences. In the MPEG-4 case, it is advantageous to use a weighted sum of the change in each object of the frame, using the area of each object as the weighting factor.

However, notwithstanding the previously developed techniques, a need remains for a simplified technique for identifying a desired frame, object, shot or sequence from a compressed bit-stream.

SUMMARY OF THE INVENTION

The present invention is directed to descriptors for frames represented in a compressed bit-stream corresponding to a video sequence including intra-coded frames, e.g. I frames, and inter-coded frames, e.g. B and P frames. It will be understood that, I frames are also referred to as anchor frames and B and P frames are often referred to as predictive frames. As used herein, the term "frame" includes frames as defined under most current MPEG standards as well as objects as defined under the current MPEG-4 standard. The term is also intended to cover other segmentations of compressed bit-streams as may be defined in future MPEG or similar video standards or other non-video standards.

The invented descriptors can be used to index, select or otherwise identify a desired frame for any number of reasons, as will be well understood by those skilled in the art. For example, the descriptor can be used to identify, from bits of the compressed bit-stream, the frame within the entire sequence or a shot, i.e. a subset of adjacent frames within the video sequence, which most closely matches a query frame, includes an object of interest, or represents the beginning of a new scene.

Compressed bit-streams for video sequences include bits associated with each of the intra-coded and inter-coded frames. With regard to the inter-coded frames, the bits typically represent a number of different parameters, including a displacement from the associated inter-coded frame, e.g. a B or P frame, to a closest matching intra-coded frame, e.g. an I frame. Under conventional NPEG standards, the represented displacement is customarily characterized by a displacement vector, sometimes also referred to as a motion vector.

It will also be recognized that under MPEG standards, e.g. MPEG-2, the displacement to the intra-coded frame may be directly or indirectly represented. More particularly, under most current MPEG protocols, the bits associated with a particular B frame will directly represent a displacement to the applicable I frame. However the bits associated with a particular B frame can also directly represent a displacement to a P frame which has associated bits directly representing a further displacement to the applicable I frame. Hence, in such a case, the bits representing the displacement of the particular B frame of interest will indirectly represent the displacement to the applicable I frame.

In accordance with the invention, the magnitude of the displacement of an inter-coded frame is determined based on the bits in the compressed bit-stream associated with that inter-coded frame. Preferably, the compressed bit-stream is entropy decoded and the displacement magnitude is determined from the entropy decoded compressed bit-stream. The inter-coded frame is then identified based upon the determined displacement magnitude. In other words, the magnitude of displacement determined from the bits of the compressed bit steam serves as a descriptor which is used to identify the inter-coded frame as the desired frame. The displacement magnitude may serve to characterize only the frame itself, or the entire video sequence, or a subset of the sequence, i.e. a particular shot. Thus, using the determined displacement magnitude, the particular frame, the particular shot in a sequence or even the particular sequence in a set of sequences which, for example, most closely matches a query, includes an object of interest, or represents the beginning of a new scene can be identified through the identification of the frame.

For example, to index to the desired frame of a video sequence, the determined magnitude of the displacement, represented by the bits of the compressed bit-stream of each of the frames in the video sequence, may be compared with the magnitude of displacement of a query frame. That frame of the video sequence which has a displacement magnitude which most closely matches the displacement magnitude of the query frame is identified. This frame can now be used for any number of purposes, e.g. to index the video sequence, to retrieve the beginning frame of a scene, or to locate a frame having an image of an object of interest not appearing in preceding frames, etc.

Typically, each of the inter-coded frames will include a plurality of macro-blocks, and each of the macro-blocks will be associated with a respective portion of the bits representing a displacement from the associated macro-block to the closest matching intra-coded frame. In accordance with an aspect of the invention, the displacement magnitude of each inter-coded frame is determined by determining, based on the portion of the bits in the compressed bit-stream associated with that inter-coded frame, an average magnitude of the displacement per macro-block for the frame. This can be accomplished by simply dividing the sum total of the determined displacement magnitudes of all the macro-blocks by the total number of macro-blocks included in the applicable frame. The desired inter-coded frame is then selected based upon the determined average displacement magnitude.

According to further aspects of the invention, the determined displacement magnitude represented by the applicable portion of bits associated with the applicable macro-block is, for example, set to zero if the displacement magnitude for that macro-block is less than a threshold. Preferably, the threshold is the determined average displacement magnitude for the applicable frame. A value corresponding to the run lengths for those macro-blocks having the displacement magnitude less than the threshold is determined. Preferably, the value is equal to the number of the applicable run lengths. For example, the value could be the number 3 indicating that there are 3 run lengths having runs of macro-blocks with a displacement magnitude of less than the threshold. The desired inter-coded frame can then be identified based upon both the determined displacement magnitude, e.g. the average displacement magnitude, and the determined value corresponding to the run lengths. In other words, the magnitude of displacement determined from the bits of the compressed bit steam and the value corresponding to the run lengths determined from the determined displacement magnitudes of the macro-blocks together serve as a descriptor which can be used to identify the desired inter-coded frame. This multi-parameter descriptor provides a somewhat enhanced characterization of the applicable frame as compared to the above described descriptor without the run lengths.

The sum of the determined run lengths will equal the total number of macro-blocks having the displacement magnitude less than the threshold. Beneficially, each of the determined run lengths is categorized in one of multiple categories, each corresponding to a different run length range. Preferably, three categories are used, i.e. short, medium and long length run ranges. The number of run lengths within each of the categories is computed. An inter-coded frame can then be identified based upon the determined displacement magnitude and the determined number of run lengths in each category. That is, the magnitude of displacement and the run lengths in each category can, if desired, serve as the descriptor which is used to identify the desired inter-coded frame. This multi-parameter descriptor may provide an even more enhanced characterization of the applicable frame as compared to the above described multi-parameter descriptor with the run lengths.

To improve accuracy, the descriptor is advantageously normalized. The displacement magnitude is typically normalized based upon the frame width. However, to ensure compatibility with different encoding protocols, the displacement magnitude and the value(s) corresponding to run lengths are preferably normalized based on one or more of the parameters used to encode the encoded bit-stream. More particularly, the magnitude and value are normalized based on the encoding frame format, frame size, frame rate and/or bit rate.

To further improve processing efficiency, the determined displacement magnitude can be combined with the determined run lengths. In this regard, the combination of parameters could, for example, be reduced to only a single value. The combined displacement magnitude and run lengths can then be used to identify the desired inter-coded frame.

As discussed above, the video sequence may include multiple shots, each formed of a respective series of adjacent inter-coded frames. In some cases, it may be desirable to determine not only the average magnitude of displacement per macro-block for the macro-blocks of each of the inter-coded frames forming the shot as described above, but also to determine the average of the average displacement magnitudes per macro-block per frame for all the macro-blocks of the entire shot. In such case, the determined average displacement magnitude per macro-block of each of the inter-coded frames in the shot are, in one alternative implementation, compared to a determined average displacement magnitude per macro-block per frame. The determined average displacement magnitude per macro-block of the inter-coded frame which best represents the shot is then identified based on the comparison. For example, the inter-coded frame within the shot having an average displacement magnitude per macro-block closest to the determined average displacement magnitude per macro-block per frame of the entire shot might be identified as best representing the shot as a whole or some particular content of interest within the shot. Alternatively, a frame, e.g. an arbitrarily selected frame, may be associated with the determined average displacement magnitude per macro-block per frame and identified on the basis of this association, without the above described comparison being performed.

In a preferred embodiment of the invention, a desired frame in a compressed video bit-stream corresponding to a video sequence is identified based on descriptors which are determined from bits of the compressed bit-stream associated with each of the inter-coded frames. The bits represent (i) the magnitude of the displacement per macro-block, for the associated inter-coded frame, to a closest matching of the intra-coded and/or (ii) a value corresponding to, e.g. the number of, run lengths of those of the plurality of macro-blocks of the associated inter-coded frame having a displacement magnitude to a closest matching intra-coded frame equaling less than a threshold amount. Two of the inter-coded frames, or more, are first identified based on the respective displacement magnitude per macro-block of the inter-coded frames. Only one of these inter-coded frames is then identified based on the number of run lengths associated with that inter-coded frame.

According to still another aspect of the invention, the frequency of occurrence of the number of the run lengths associated with each of the two or more inter-coded frames is compared with the frequency of occurrence of the number of the run lengths associated with the other of the two or more inter-coded frames. The desired inter-coded frame is identified based on the differences between the frequencies of occurrence.

The compressed bit-stream can be stored in a memory. A processor can then determine the displacement magnitudes of the inter-coded frames based on the bits in the stored compressed bit-stream and subsequently identify the desired inter-coded frame based on the determined displacement magnitude and/or run lengths as previously described. The processor can, if desired, be further configured to determine average displacement magnitudes, to set the displacement magnitudes which are below a threshold to zero, to determine run lengths for those of the plurality of macro-blocks having their displacement magnitudes equaling less than the threshold, to categorize run lengths, to compute the number of run lengths within each category, and to combine the determined displacement magnitude with the determined run lengths, as has been previously discussed.

BRIEF DESCRIPTION OF THE DRAWINGS

FIG. 7A depicts the compression complexity matrices for a frame represented in the compressed bit-stream of FIG. 1 in accordance with the present invention.

FIG. 7B depicts the compression complexity matrices for another frame represented in the compressed bit-stream of FIG. 1 in accordance with the present invention.

FIG. 13 is a table listing a set of MPEG-4 objects known in the HDTV art, along with descriptors derived in accordance with the first embodiment of the present invention.

DESCRIPTION OF THE PREFERRED EMBODIMENT

Figure 1:
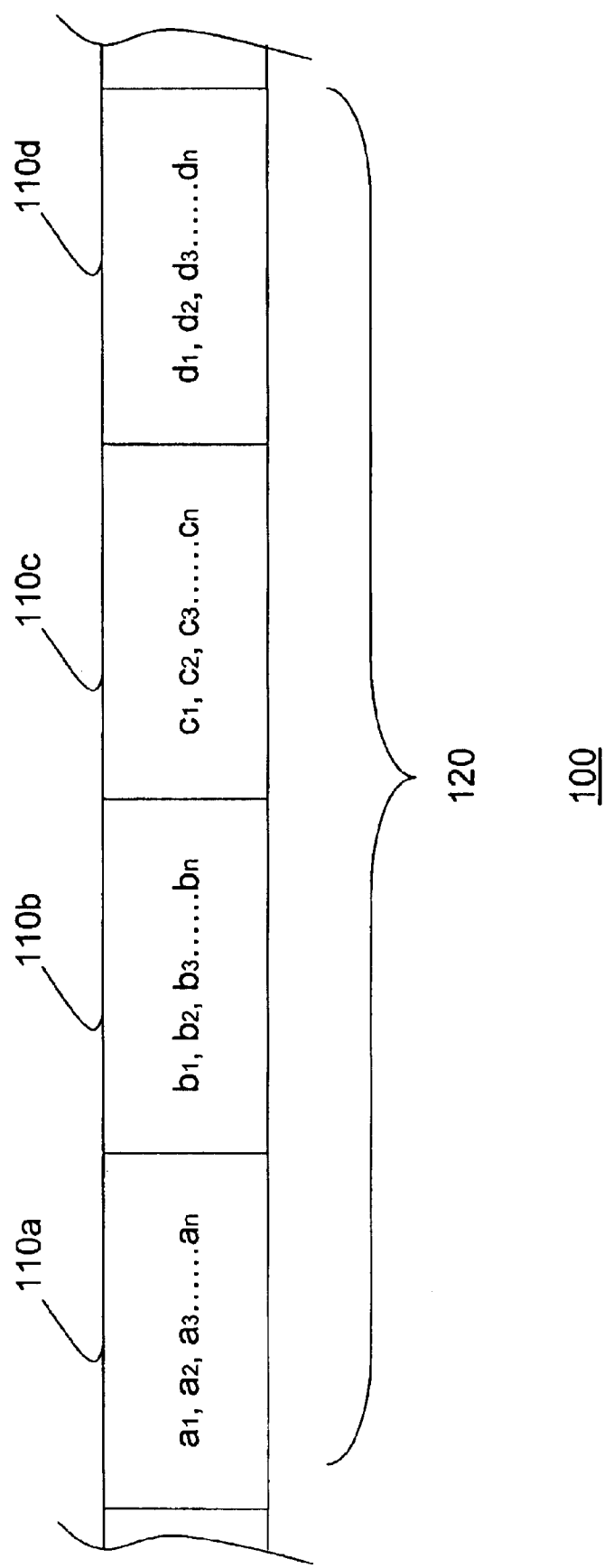
FIG. 1 depicts a compressed video bit-stream.

FIG. 1 is a simplified depiction of a compressed bit-stream 100 which includes bits $110a_1$–$110a_n$ representing intra-coded frame 110A, bits $110b_1$–$110b_n$ representing inter-coded frame 110B, bits $110c_1$–$110c_n$ representing frame 110C and bits $110d_1$–$110d_n$ representing inter-coded frame 110D. As indicated in FIG. 1, frames 110A–110D further represent a shot 120, As will be recognized by those skilled in the art the bits of compressed bit-stream 100 will, in practice, typically represent hundreds or thousands of frames, and these frames will typically represent numerous different shots. The shots, in turn, will form the full video sequence, e.g. a movie, which is filly represented by the compressed bit-stream 100, The compressed bit-stream 100 could be encoded according to any of a number of different encoding protocols, as will be well understood by those skilled in the art.

Figure 2A:
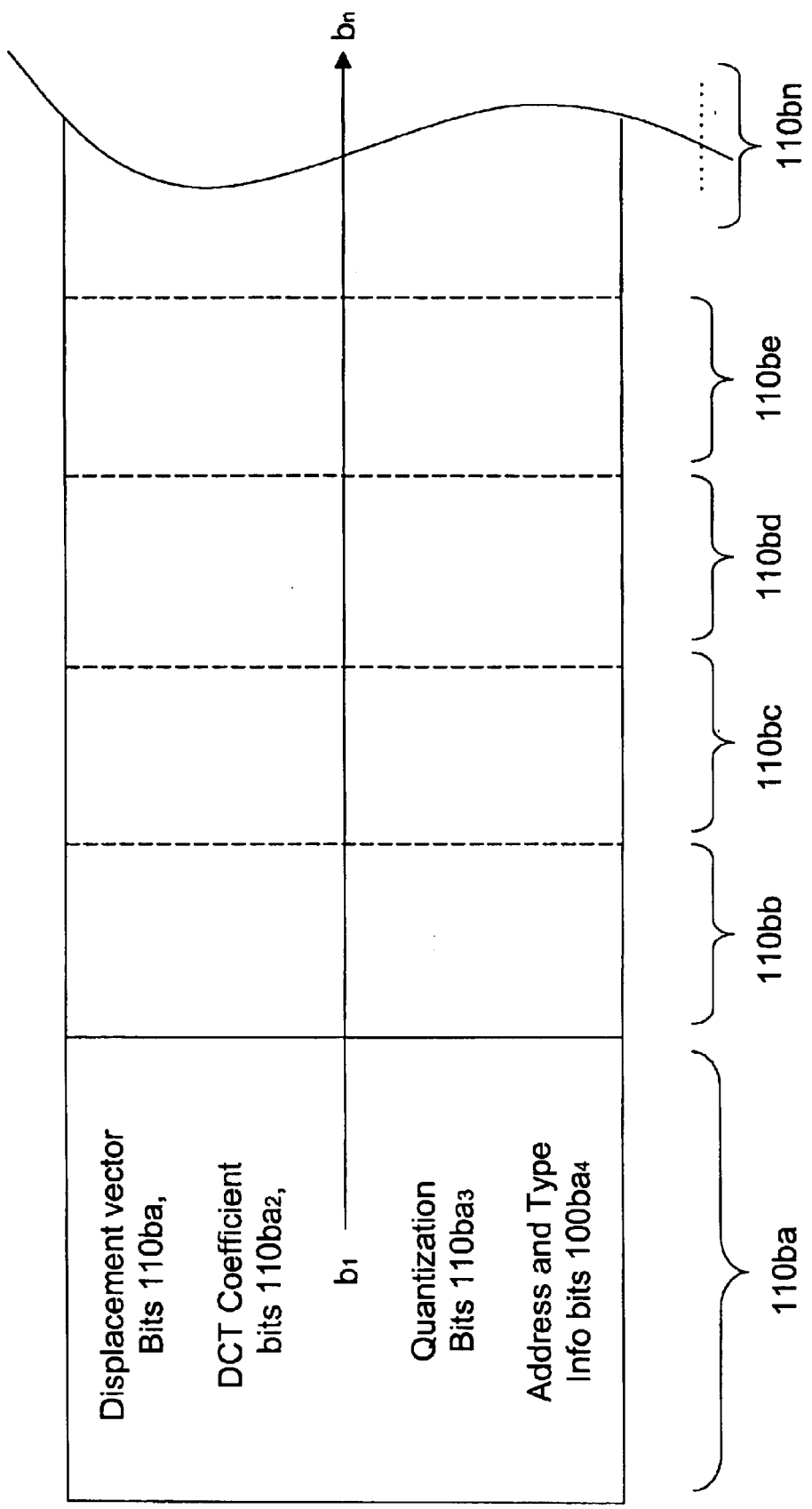
FIG. 2A depicts bits of the compressed bit-stream of FIG. 1 which are associated with the macro-blocks of a particular frame.

Respective bits associated with each frame 110A–110D represent parameters associated with each macro-block of the applicable frame. More particularly, as shown in FIG. 2A, a respective portion of the bits $110b_1$–$110f_n$ represent the parameters of macro-block 110aa, 110ab, 110ac, 110ad, 110ae and continuing to 110an. The parameters represented by the bits associated with each macro-block of inter-coded frames include bits representing the displacement vector which indicate the magnitude of the displacement from the applicable macro-block to the closest matching inter-coded frame. As shown in FIG. 2A, the compressed bit-stream 100 includes displacement vector bits $110aa_1$ for macro-block 110ba of frame 110A to the closest matching intra-coded frame, in this case frame 110A. As also shown, the bits representing each macro-block will also include DCT coefficient bits $110aa_2$ which represent the residual or difference information from the information in the closest matching intra-coded frame 110A. The bits associated with macro-block 110ba further include quantization bits $110aa_3$ and address and type information bits $110aa_4$, Similarly, macro-blocks 110bb through 110bn will include displacement vector bits, DCT coefficient bits, quantization bits and address and type information bits defining parameters of the applicable macro-block.

Figure 2B:
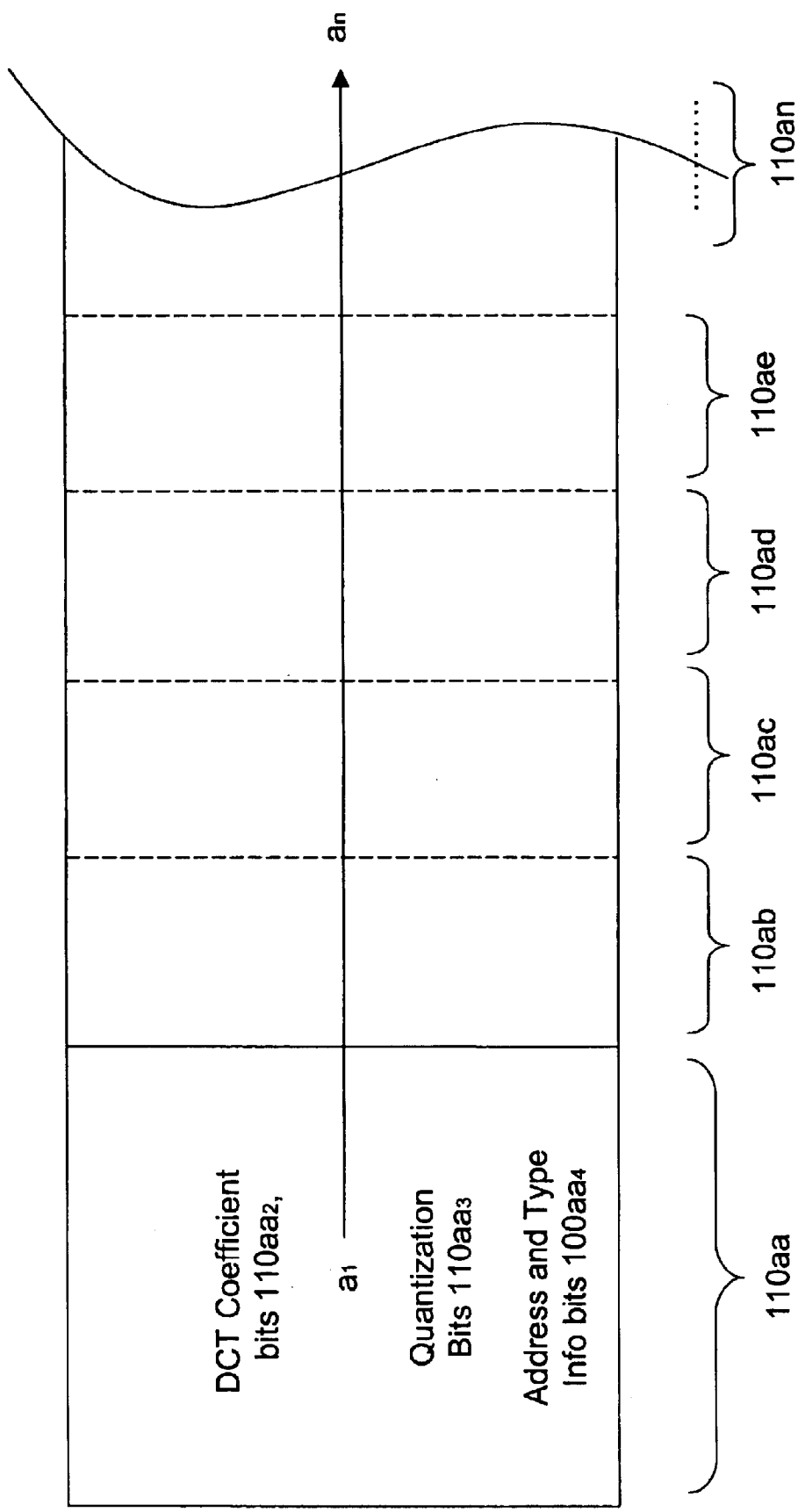
FIG. 2B depicts the bits of the compressed bit-stream of FIG. 1 associated with the macro-blocks of another frame.
Figure 3:
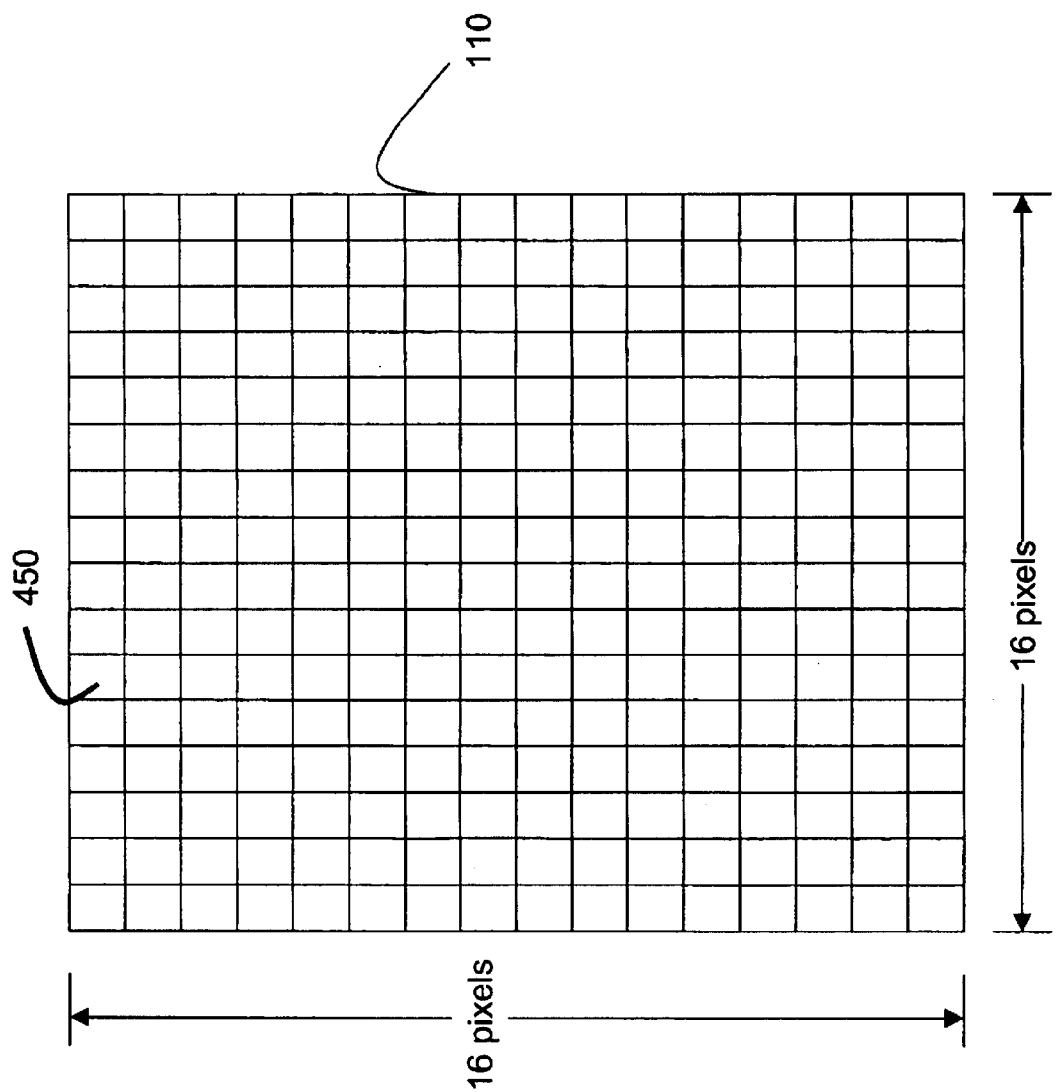
FIG. 3 depicts a macro-block consisting of 16×16 pixels.

As shown in FIG. 2B, respective portions of the bits in the compressed bit-stream 100 representing intra-coded frame 110A are associated with each of the macro-blocks 110aa–110an of frame 110A. However, for intra-coded frames such as frame 110A, there are no displacement vector bits and the DCT coefficient bits $110aa_2$ represent the contents of the frame itself rather than the differences between it and another frame, as is the case with inter-coded frames such as frame 110B of FIG. 2A. The bits associated with macro-block 110aa also include quantization, address and type information bits $110aa_3$ and $110aa_4$, As shown in FIG. 3, each of the macro-blocks 110 represent 16 columns and 16 rows of pixels 450, Each macro-block could, if desired represent other than a 16 pixel×16 pixel block.

Figure 4:
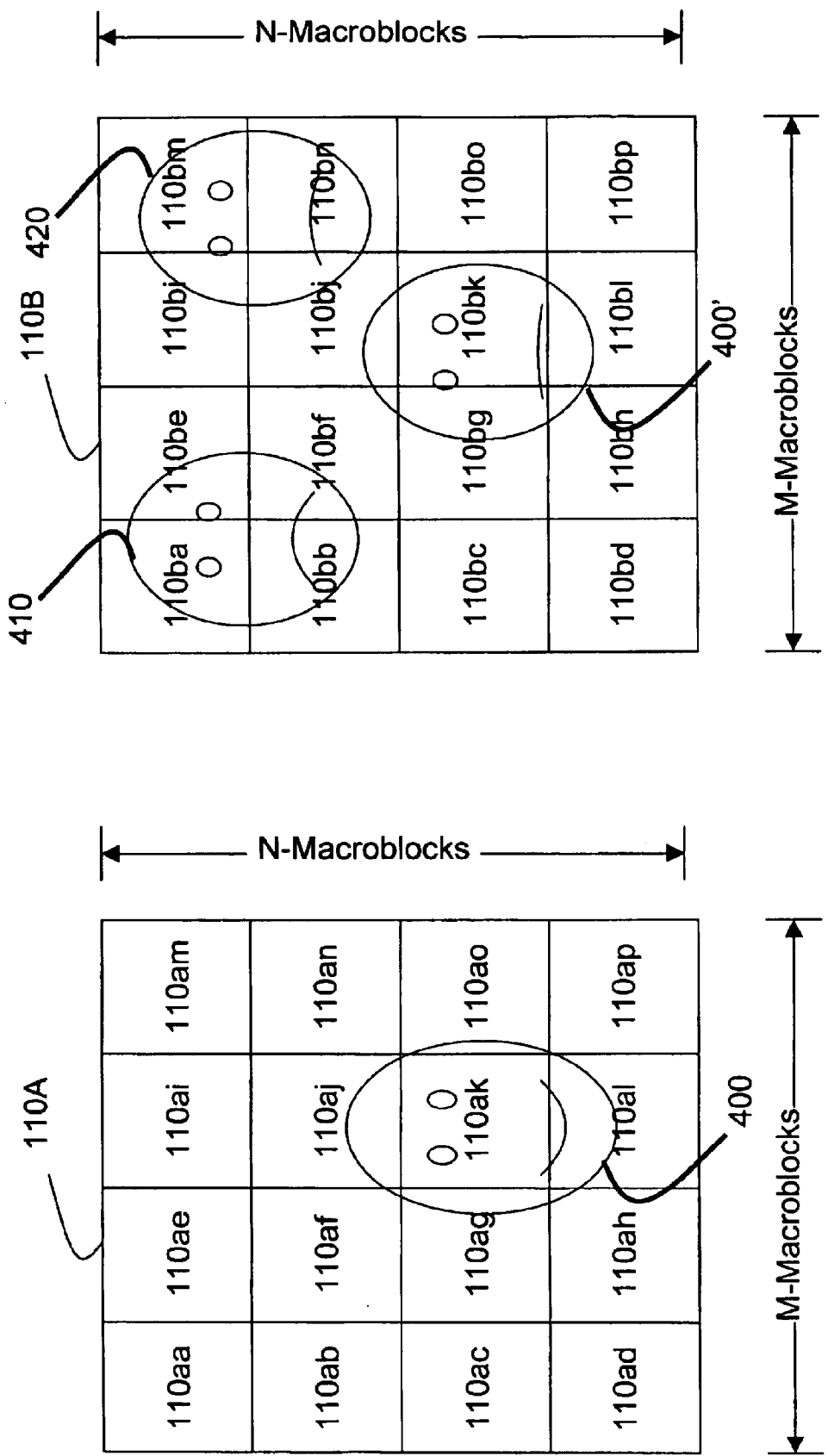
FIG. 4 depicts images in a relationship to macro-blocks of certain frames represented in the compressed bit-stream of FIG. 1.

FIG. 4 represents a simplified depiction of intra-coded frame 110A and inter-coded frame 110B, with each of the frames divided into macro-blocks. In the case of intra-coded frame 110A, the entire frame is divided up into macro-blocks 110aa through 110ap, and includes an image of a talking head 400 which is formed by the pixels of macro-blocks 110af–110ah and 110aj–110al.

Inter-coded frame 110B includes macro-blocks 110ba through 110bp and has an image of a talking head 400', which is similar to talking head 400, formed by the pixels in macro-blocks 110bf–110bh and 110bj–110bl. Inter-coded frame 110B further includes talking heads 410 and 420, Talking head 410 is formed by the pixels of macro-blocks 110ba, 110bb, 110be and 110bf. Talking head 420 is formed by the pixels of macro-blocks 110bi, 110bj, 110bm and 110bn.

Because of the similarities between the talking heads 400 and 400' as imaged in blocks 110ag and 110bg, 110ah and 110bh, 110ak and 110bk, and 110al and 110bl, the magnitude of the displacement vectors from macro-blocks 110*bg, bh, bk* and *bl* will be relatively small. On the other hand, because of the substantial change in the images depicted in macro-blocks 110*ba*, 110*bb*, 110*be*, 110*bf* from the images of macro-blocks 110*aa*, 110*ab*, 110*ae* and 110*af*, a relatively large displacement vector and DCT coefficient will be required to represent each of macro-blocks 110*ba, bb, be* and *bf*. Similarly, macro-blocks 110*bi*, 110*bj*, 110*bm* and 110*bn* will require relatively large displacement vectors and DC coefficients to define the differences with respect to inter-coded frame 110A. Hence, the displacement vectors represented by bits 110*ba*, and the residual data represented by bits 110*ba$_2$*, which together indicate the spatio-temporal compression complexity of a video sequence, will be relatively large for macro-blocks 110*ba*, 110*bb*, 110*be*, 110*bf*, 110*bi*, 110*bj*, 110*bm* and 110*bn*, and relatively small for macro-blocks 110*bg*, 110*bh*, 110*bi*, 110*bk* and 110*bl*.

Since larger displacement vectors and residuals take more bits to encode for the same quantization step-size, the number of bits x expended on displacement vectors and the number of bits y expended on the residuals will vary from macro-block to macro-block and from frame to frame based on the size of the displacement vectors and residuals. Accordingly, the spatio-temporal compression complexity of a video sequence can be determined based upon the number of bits in the compressed video bit-stream 100 which represent the displacement vectors and the residuals of the frame of interest.

Figure 5A:
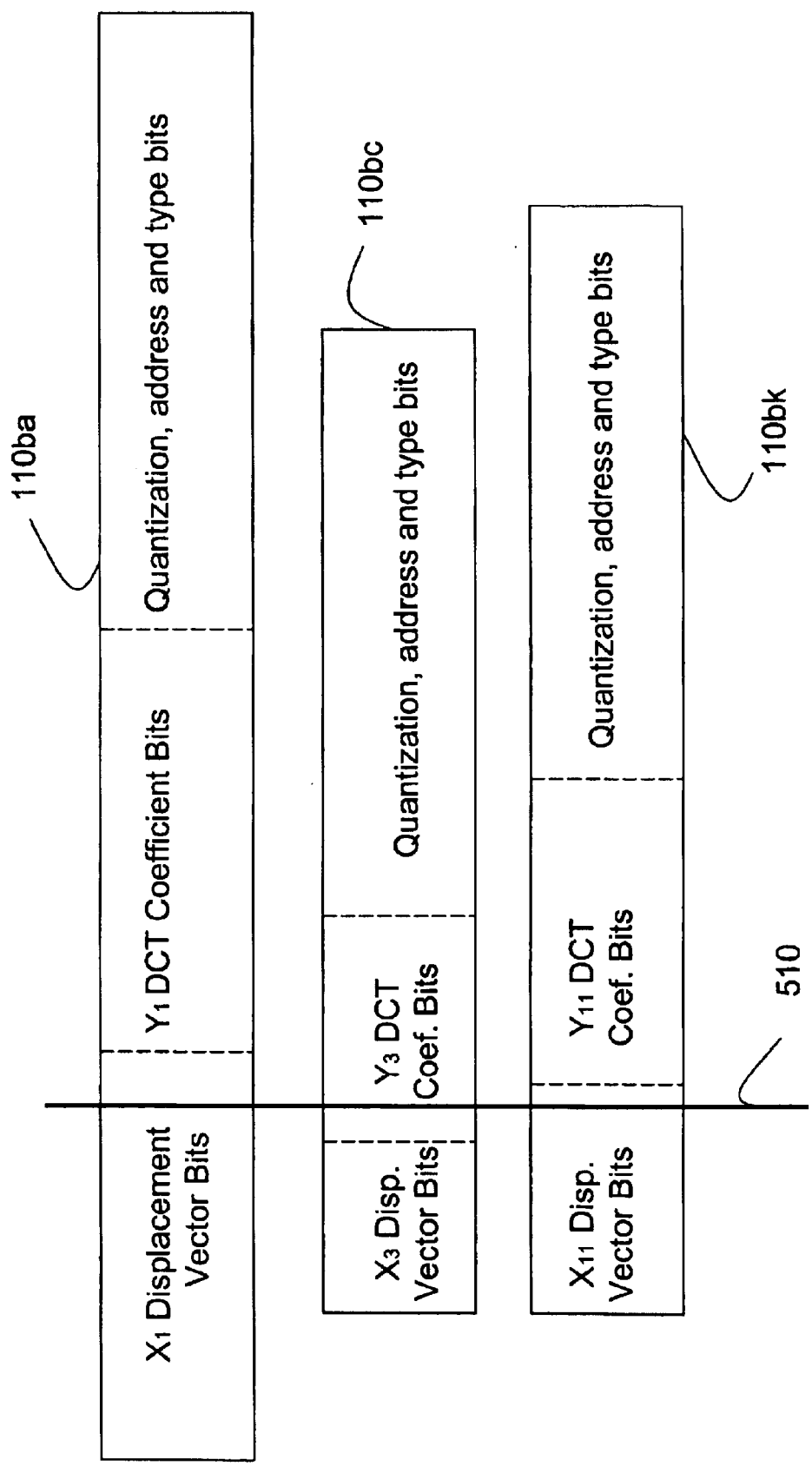
FIG. 5A depicts the segmentation of macro-block bits for macro-blocks of a frame represented in the compressed bit-stream of FIG. 1.

As shown in exemplary FIG. 5A, the segment of the bits in the compressed bit-stream 100 representing the macro-block 110*ba* bits have a number of bits $x_1$ representing the displacement vector magnitude and a number of bits $y_1$ representing the DCT coefficient. Other macro-block 110 ba bits are also included in the bit-stream segment to represent the quantization step size and address and type information as previously discussed with reference to FIG. 2A. That segment of the bits of the compressed bit-stream 100 representing the macro-block 110*bc* bits includes a number of bits $x_3$ representing the magnitude of the displacement vector and a number of bits $y_3$ representing the DCT coefficient for the macro-block. Also shown are the bits of the compressed bit-stream 100 associated with the macro-block 110*bk*. As indicated in this segment of the bit-stream, the displacement vector magnitude for macro-block 110*bk* is represented by a number of bits $x_{11}$ and a number of bits $y_{11}$ representing the DCT coefficient.

As can be seen from FIG. 5A, the number of bits $x_1$ representing the displacement vector of the macro-block 110*ba* exceeds the number of bits $x_1$ and $x_{11}$ representing the displacement vectors for macro-blocks 110*bc* and 110*bk*. Likewise, the number of displacement vector bits $x_{11}$ is greater than the number of displacement vector bits $x_3$. And the number of DCT coefficient bits $y_1$ exceeds the number of DC coefficient bits $y_3$ and $y_{11}$. These differences reflect the size of the displacement vectors and DCT coefficients required for the respective macro-blocks in view of the differences between the macro-blocks of inter-coded frame 110B and the macro-blocks of the closest matching intra-coded frame 110A, as shown in FIG. 4.

Hence, the bit expenditure, i.e. the number of bits x and y, representing the displacement vector magnitude and the DCT coefficient for each of the macro-blocks of the inter-coded frames 110B–110D of FIG. 1 can be readily determined from the bits associated with the applicable macro-block of the compressed bit-stream 100, As shown in FIG. 5A, the compressed bit-stream 100 of FIG. 1 is subjected to variable length code parsing, i.e. entropy decoding, to segment the applicable bits associated with each of the macro-blocks. No decoding of the DCT coefficients is required.

The bit expenditures, coupled, if desired, with quantizer step-size, are used to represent the spatio-temporal compression complexity, which can in turn be used as a matching criterion for indexing video sequences, for locating a scene change or object within the sequence or for identifying a desired frame for any other reason.

Figure 5B:
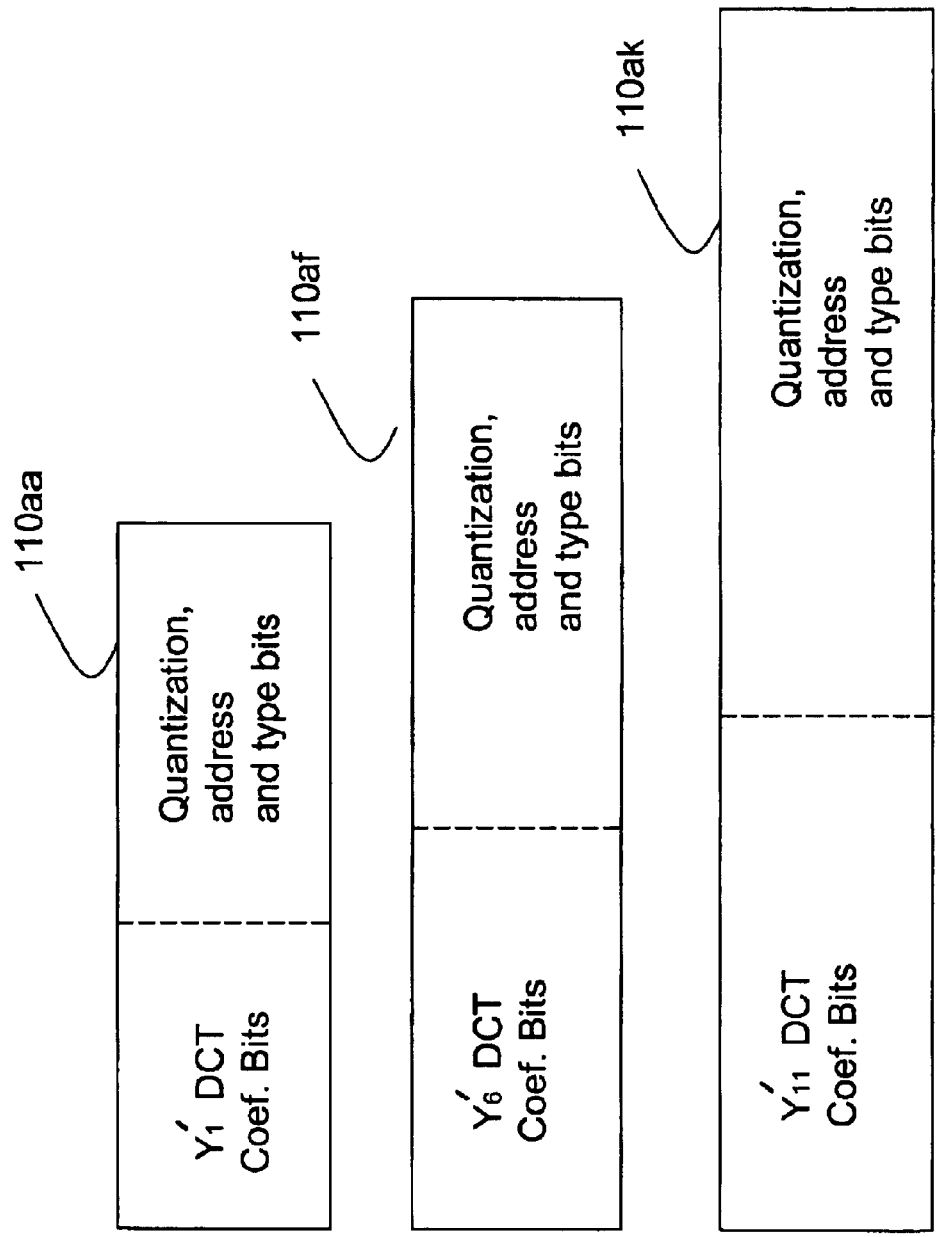
FIG. 5B depicts the segmentation of macro-block bits for macro-blocks of another frame represented in the compressed bit-stream of FIG. 1.

FIG. 5B depicts a segmentation of the macro-block bits for inter-coded frame 110A. For exemplary purposes, only the segments of the compressed bit-stream 100 having the bits associated with macro-blocks 110*aa*, 110*af* and 110*ak* are shown. As depicted, for macro-block 110*aa* a number of bits $y'_1$ represent the DCT coefficients. The segment of bits representing macro-block 110*aa* also includes quantization, address and type bits as indicated. It will be noted that because the represented blocks form part of an intra-coded frame, no displacement vector bits are necessary Accordingly the macro-block segments for frame 110A do not include any such bits. Because of the images associated with macro-blocks 110 af and 10*ak*, the number of bits $y'_6$ and $y'_{11}$ needed to represent the DCT coefficients for these macro-blocks is greater than the number of bits $y'_1$ associated with macro-block 110*aa*.

Using the determined number of bits x and y for the displacement vector and/or DCT coefficient descriptor can be constructed for each frame. More particularly, for each frame, two "compression complexity matrices"$C_{mv}$ for the displacement vectors and $C_{res}$ for the DCT coefficients, are constructed using the number of bits required for encoding the displacement vectors and the number of bits required for encoding the DCT coefficients, i.e. the residuals, of each macro-block in the applicable frame, as follows:

$$C_{mv} = \{R_{mv}(i,j)\} \quad (1)$$

$$C_{res} = \{R_{res}(i,j)\} \quad (2)$$

where $R_{mv}$ and $R_{res}$ are the rate matrices corresponding to the displacement vectors and the residuals, respectively over macro-blocks i through j.

If a macro-block is encoded as an intra-coded block, then its displacement vector bit expenditure is zero, i.e. $C_{mv}=0$, and its residual bit expenditure, i.e. $C_{res}$, is equal to the bits spent on the intra coding.

FIG. 7A depicts the compression complexity matrices 710 and 720 for the frame 110B. The matrix 710 for the displacement vector is populated with the number of bits $x_1$–$X_{16}$ associated with the macro-blocks 10*ba*–110*bp* shown in FIG. 4. Matrix 720 is populated with the numbers of bits $y_1$–$y_{16}$ which represents the DCT coefficients associated with macro-blocks 10*ba*–110*bp*.

FIG. 7B depicts the compression complexity matrices 730 and 740 for frame 110 Because frame 110A is an intra-coded frame, the matrix 730 representing the displacement vectors for macro-blocks 10*aa*–110*ap* is populated with zeros. The matrix 740 is populated with the numbers of bits $y'_1$–$y'_{16}$ representing the DCT coefficients associated with the macro-blocks 110*aa*–110*ap*.

The Quantization Parameter Q P for each of the macro-blocks is also preferably constructed into a matrix Q. Although the displacement vector bit expenditure is not directly affected by quantizer step size, the quantizer step size may affect the residual bit expenditure directly. Since the quantization step size value may be different for each macro-block, the number of quantization bits for each macro-block are preferably also arranged in the form of a matrix and a quantization step size value is included as part of the descriptor.

The average number of bits spent on displacement vectors per macro-block $C_{mv}^{avg}$ of the frame can be calculated from $C_{mv}$. Where M×N are the numbers of macro-blocks, for the frames shown in FIG. 4A M (width)=4 and N (height)=4, the average number of bits representing the displacement vectors per macro-block in the frame may be calculated by summing the number of bits x, for frame 110B $x_1$ to $x_{16}$ as shown in FIG. 7A, for every one of the displacement vectors associated with the frame macro-blocks and dividing that sum by the number of macro-blocks in the frame, for frame 110B the number 16, This average is a highly useful measure of the temporal complexity of the frame and can be used as a first matching criterion to eliminate from consideration frames that are considerably more or less displacement-intensive than, for example, a query frame. For example, in an MPEG video compression system, this average number of displacement vector bits facilitates easy distinction between still and moving objects. The maximum number of bits spent per macro-block and the minimum number of bits spent per macro-block for displacement in each frame may also be computed.

The average compression complexity of the residual per macro-block $C_{res}^{avg}$ for each frame can be similarly calculated by summing the number of bits y, for frame 110B $y_1$ to $y_{16}$, for the DCT coefficients divided by the macro-blocks, for frame 110b the number 16, This number is also used to further classify or match frames.

The "run-length" attributes of the displacement vector matrix are next computed by comparing the number of bits x represented by each element of the motion vector rate matrix to a threshold value equal, for example, to the average number of bits spent on displacement vectors per macro-block for the applicable frame. More particularly, a further displacement vector threshold matrix $C_{mv}^{trench}$ (i,j), is formed with the number of bits x in the displacement vector matrix which are less than the threshold are set to zero. The number of bits x represented which are equal to or greater than the threshold are retained in the matrix. The threshold is beneficially provided as part of the descriptor.

The run-lengths of zeroes in the motion vector threshold matrix are determined. The total number of zeroes $N_0$ is also determined by summing all the run-lengths. The run-lengths are then classified into three categories, e.g. short, medium and long. For QCIF images, the short range may, for example, be defined as less than 6% of the total number of macro-blocks in the frame, the medium range as up to about 9–10% and the long range as above the upper limit of the medium range (e.g. 10%). These percentage ranges can also be applied in other cases but can also be varied if so desired.

The number of elements in each of the three categories, i.e. $N_{sr}$, $N_{mr}$, and $N_{lr}$, are determined. These numbers are used as the run-length features for matching. Three different levels or categories are used to prevent translated or mirror reflected versions of the same frame from producing radically different descriptors. Moreover, this categorization simplifies calculations and helps to compare objects or frames of different sizes. Frames with mostly short runs may include, for example, head and shoulder sequences, while frames with mostly long runs are more likely to include still or very slowly moving object sequences, or frames with concentrated high action. Frames with a combination of slow and fast moving objects are more likely to have mostly medium length runs.

Figure 8A:
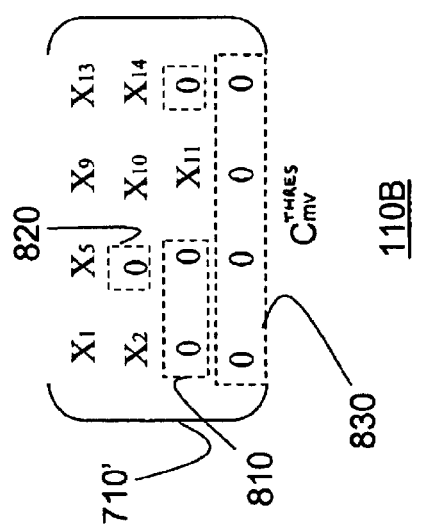
FIG. 8A depicts run-lengths for the frame of FIG. 7A in accordance with the present invention.

FIG. 8A depicts the threshold matrix 710' of the number of bits representing the displacement vectors for the macro-blocks of frame 110B. Numerous matrix elements have been set to zero based upon the threshold. Referring back to FIG. 5A, the threshold is represented by line 510 in relation to the exemplary bit-stream segments. Thus, for frame 110B, those macro-blocks, such as macro-block 110bc, having a lesser number of bits than the threshold number of bits represented by line 510 in FIG. 5A have been set to zero in matrix 710'.

Using a raster scan path beginning at the upper left corner of the matrix and ending at the lower right corner of the matrix, run-lengths 810–830 are determined. As shown, run-length 810 consists of two elements, run-length 820 of one element and run-length 830 of five elements. Accordingly, run-length 820 is classified in the short range and run-lengths 810 and 830 are classified in the long range.

Figure 6:
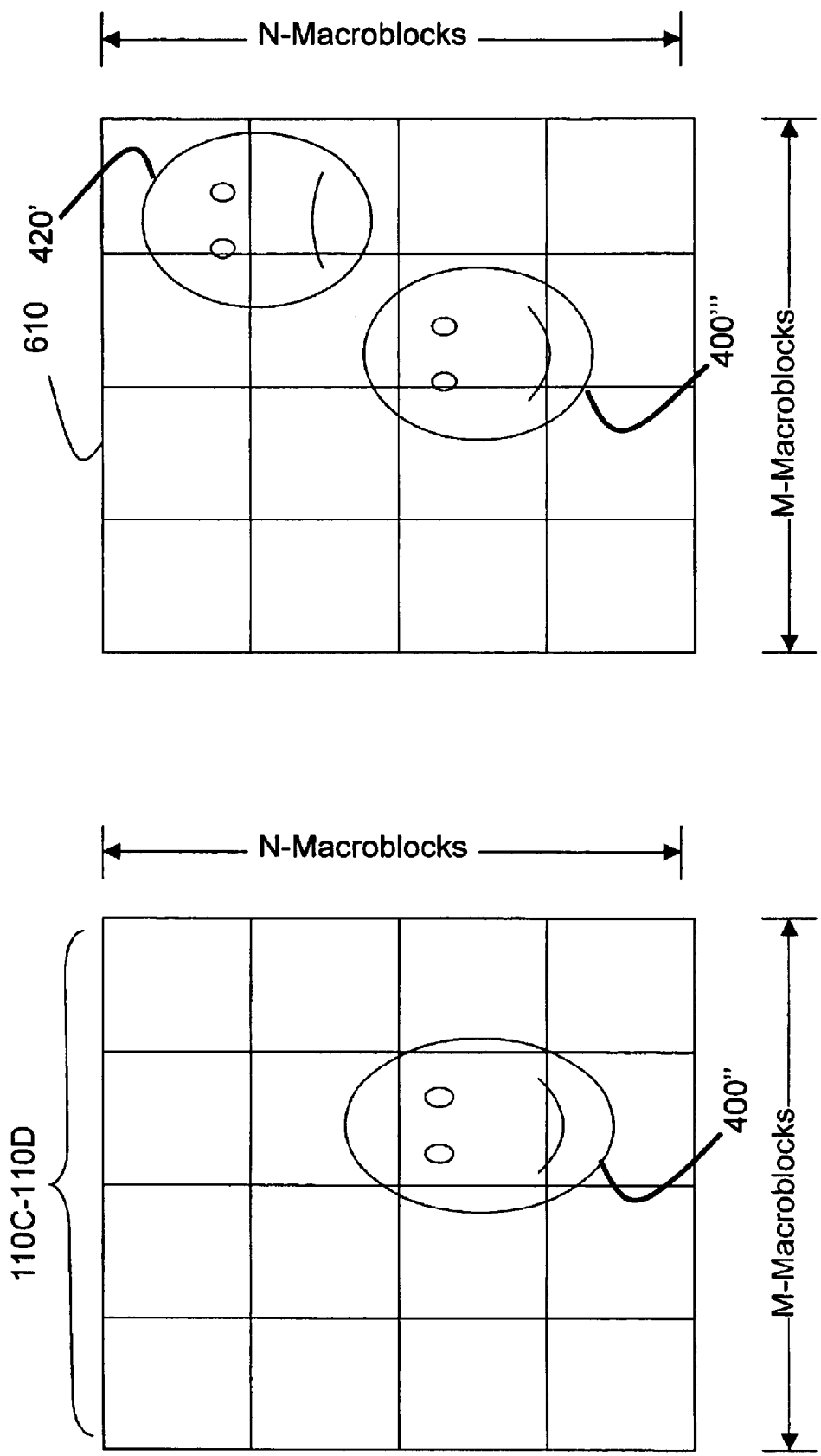
FIG. 6 depicts images in relation to macro-blocks of other frames represented in the compressed bit-stream of FIG. 1 and images in relation to macro-blocks of a query frame.

FIG. 6 depicts inter-coded frames 110C and 110D having an image 400''' formed by the pixels of certain of the frame macro-blocks. The image is similar to the image depicted in frame 110A with only slight variations.

Figure 8B:
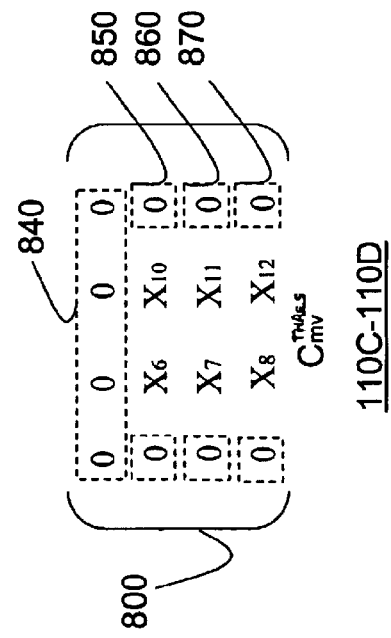
FIG. 8B represents run-lengths for other frames represented in the compressed bit-stream of FIG. 1 in accordance with the present invention.

FIG. 8B represents the displacement vector threshold matrix 800 for either of frames 110C and 110D. The matrix includes a number of elements which have been set to zero based upon the threshold for those frames. These zero elements form run-lengths 840–870, Run-length 840 consists of five elements, run-lengths 850 and 860 each consist of two elements, and run-length 870 consists of only one element. Accordingly, run-length 870 is classified in the short range and run-lengths 840, 850 and 860 are classified in the long range.

The descriptor thus consists of $C_{mv}^{avg}$, $C_{mv}$, $N_0$, $N_{ar}$, $N_0$, $N_{mr}$, $C_{res}^{avg}$, $C_{res}$, Q and additionally to the compression format, compression rate, frame size and frame rate. After a descriptor is developed for each frame of a sequence, a descriptor for a shot may be determined. First, the video sequence is temporally segmented into shots, using any desired scene change detection technique. The average number of bits expended on the displacement vectors per macro-block over the entire shot $C_{mv}^{shot}$ is computed. A frame may be chosen at random from that group of frames having a $C_{mv}^{ave}$ closest to $C_{mv}^{shot}$ and its descriptor is used as the descriptor for the entire shot. Alternatively, the frame having a $C_{mv}^{ave}$ closest to $C_{mv}^{shot}$ could be chosen to represent the shot. Another alternative is to calculate the average value of each of the parameters over the shot and use the resulting average values of the parameters to constitute the descriptor for the shot.

The above-described descriptor can be used for matching similar frames or shots. That is, as first pass at matching, a first list of potential matches within a group of frames or shots can be made on the basis of having similar, i.e. within some numerical range, average bit expenditure on displacement vectors per macro-block as that of a query frame, such as query frame 610 of FIG. 6 which includes images 420' and 400''' or a query shot. Then, the sum of all of the run lengths $N_0$ in each descriptor is used as a second pass to further rank all of the candidates from the first pass for a potential match with the sum of all the run lengths of the query frame. Alternatively, the category of a predetermined most frequent run-length is inspected for matches. If two candidate frames or shots have the same value for the applicable run length value, then the frequency of that run length may be used to provide a further ranking for the frames or shots. If a frame or shot does not have the same value for the most common run length category, that frame or shot is placed in an "inferior" match category. Frames or shots in the inferior match category normally would not be ranked any further.

Figure 9:
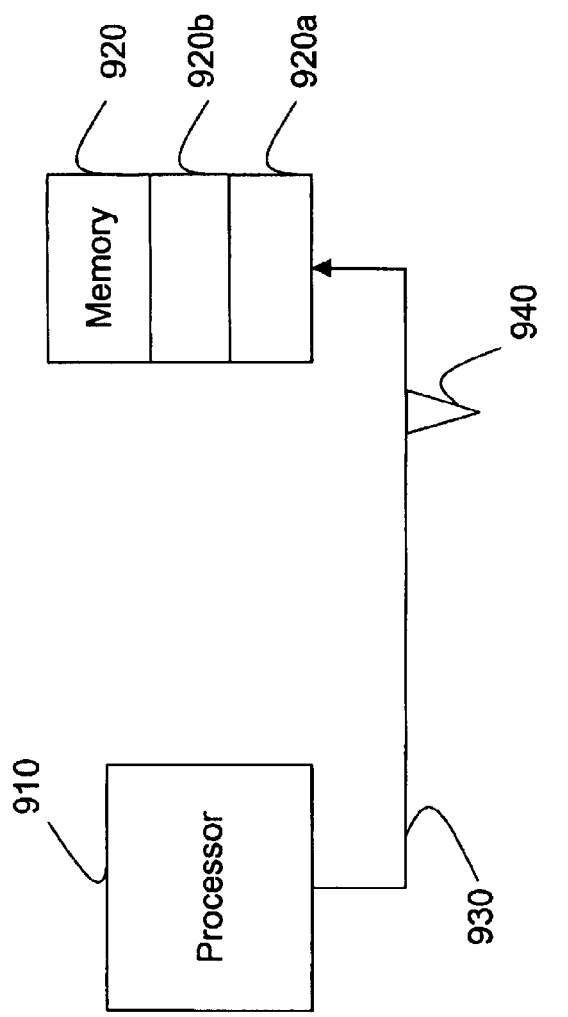
FIG. 9 represents a processing system which can be utilized in implementing the present invention.

FIG. 9 is a simplified depiction of a processing system 900 which can be used in implementing the above-described technique. The system 900 includes a processor 910 connected to a memory 920 by a bus 930, An input/output (I/O) port 940 allows information to be input to and output from the processing system. The memory includes programming 920a which directs the processor to create and/or use the above-described descriptors. As shown, the memory 920 also includes a database 920b in which constructed descriptors can be stored so that queries, e.g. compressed bit-streams, received via the I/O port 940 can be processed by the processor 910 in accordance with the programming 920a to identify an appropriate frame, shot or sequence represented within compressed bit-streams, which may also be stored on memory 920, based on the descriptors in the database 920b.

It will be recognized that the processing system 900 may be a stand alone system or could be connected via the I/O port 940 to a network, such as the INTERNET. It should also be understood that the system 900 could be implemented as multiple processing systems. In this regard, one or more of the systems could be programmed to create the descriptors while other systems could be separately programmed to identify frames, shots or full sequences based upon descriptors constructed by another system or systems. It should also be recognized that the memory storing the previously constructed descriptors could be located separate and apart from the processors which utilize the descriptors to identify frames etc. of interest. In such a case, the descriptors stored in the memory may be accessible via a network link, for example, to a separate INTERNET web site.

Figure 10:
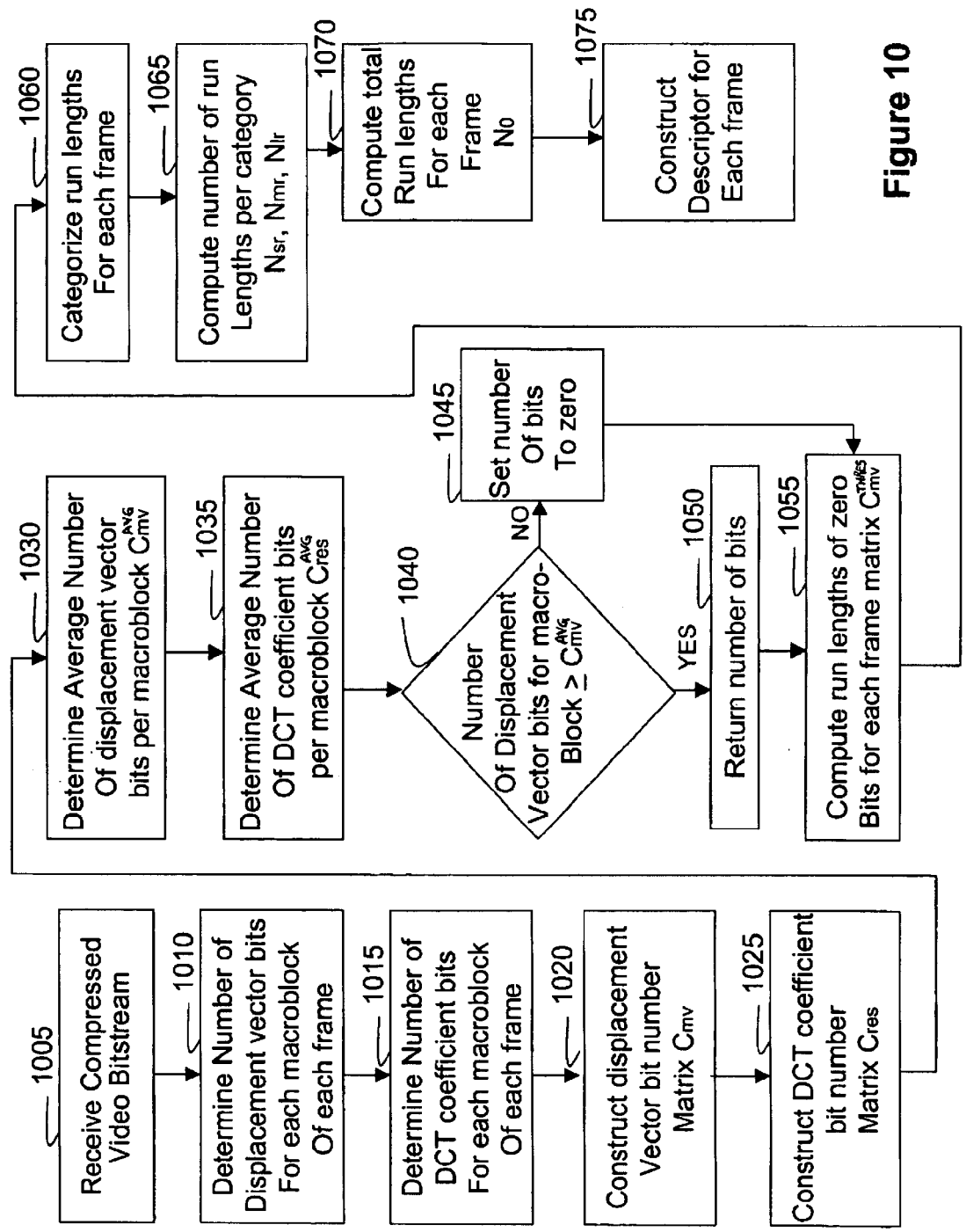
FIG. 10 is a flow chart of operations performed by the processing system of FIG. 9 in accordance with the present invention.

Referring now to FIG. 10, a compressed video bit-stream is received by the processor 910 via the I/O port 940 and bus 930 in step 1005, The processor 910, in accordance with the programming 920a stored in memory 920, determines the number of displacement vector bits for each of the macro-blocks of each frame in step 1010, The processor next determines the number of DCT coefficient bits for each macro-block of each frame in step 1015, A displacement vector bit number matrix $C_{mv}$ and a DCT coefficient bit number matrix $C_{res}$ are constructed in steps 1020 and 1025, An average number of displacement vector bits per macro-block $C_{mv}^{avg}$ along with an average number of DCT coefficient bits per macro-block $C_{res}^{avg}$ are computed in steps 1030 and 1035, The processor 910 next determines if the number of displacement vectors in the displacement vector matrix are less than a threshold, preferably $C_{mv}^{avg}$, in step 1040 and in step 1045 those elements of the matrix $C_{mv}$ which reflect a number of bits less than the threshold are set to zero. As indicated in step 1050, the other elements of each matrix are retained.

A threshold matrix $C_{mv}^{thresh}$ is constructed and the run-lengths of zero bits for each frame are computed by the processor 910 in step 1055, The processor then categorizes the run-lengths for each frame in step 1060 and computes the number of run-lengths in each of the categories in step 1065, In step 1070, the processor further computes a total run-length for each frame. The descriptor is then constructed for the applicable frame in step 1075, The descriptor can be directed via the bus 930 to the memory 920 for storage in the database 920b.

Figure 11:
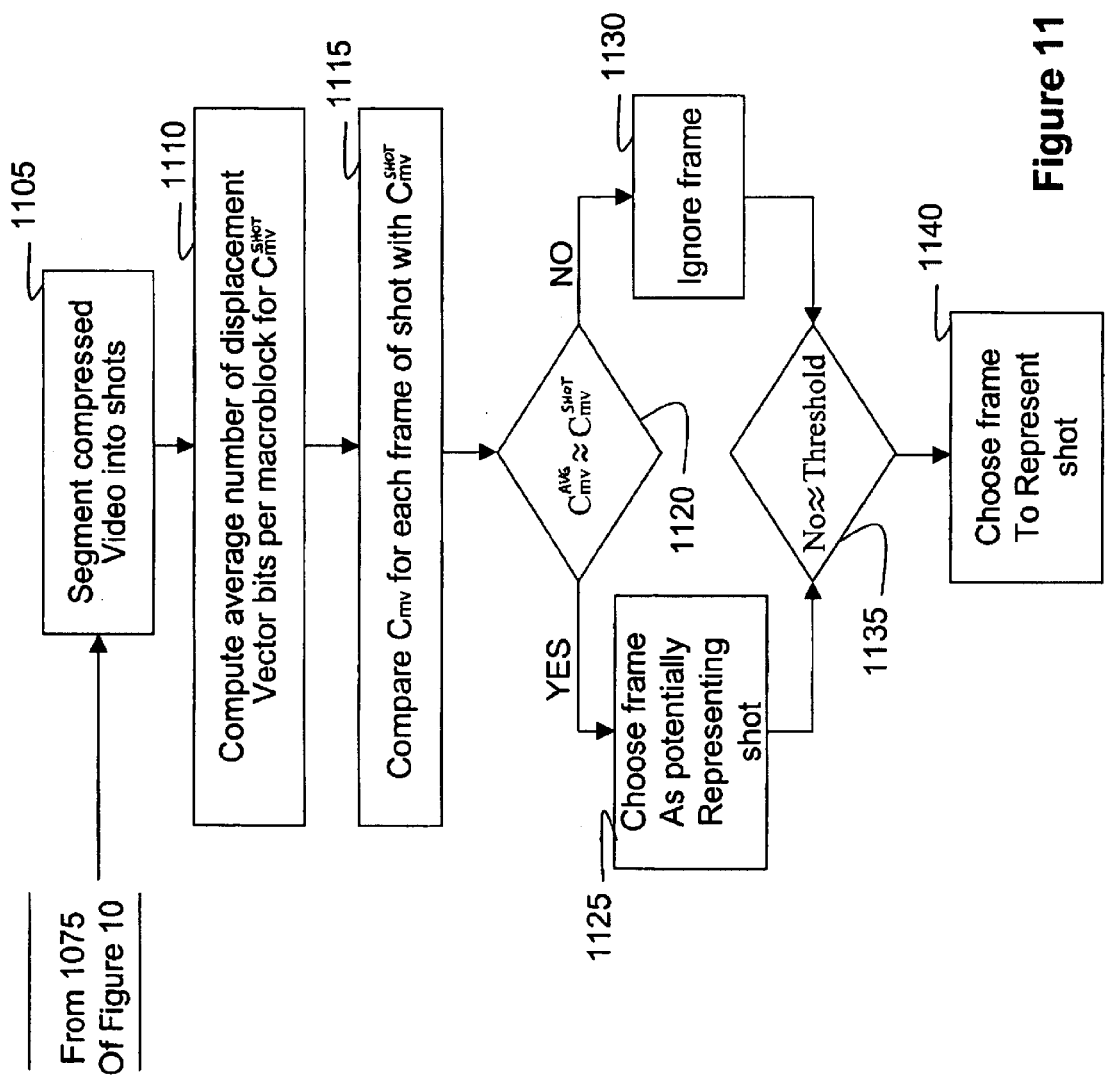
FIG. 11 is a flow chart of further operations which are optionally performed by the processing system of FIG. 9 in accordance with the present invention.

Referring now to FIG. 11, a particular frame descriptor can be selected to represent each shot represented in the compressed video bit-stream. To determine the appropriate descriptor for the shot, the processor 910, in accordance with the programming 920a stored on memory 920, segments the compressed video bit-stream in step 1105, The processor then computes an average number of displacement vector bits per macro-block $C_{mv}^{shot}$ across all of the frames within the shot segment in step 1110, The computed average for the shot is then compared with the computed average number of displacement bits per macro-block for each of the frames within the shot in step 1115, The processor next determines, in step 1120, the average number of displacement vector bits per macro-block for frames within the shot which are closest to, e.g. approximately equal to, the average number of displacement vector bits per macro-block for the entire shot. As indicated in steps 1125 and 1130, those frames having an average number of displacement vector bits which compare favorably with the average number of displacement vector bits for the shot are chosen for further analysis and the other frames are ignored. In step 1135, the average number of displacements per macro-block for the chosen frames are compared with a threshold. The frame which most favorably compares with the threshold is chosen to represent the shot in step 1140, and the other frames are ignored as indicated in step 1130, Another approach is for the processor to determine the average value over the shot for all the four parameters, and then use the resulting average values of the individual parameters to constitute the descriptor for the shot.

The application of the foregoing techniques to well-known test images(sequences) is useful for an understanding of the nature of descriptors which can be obtained and the analysis which can be performed. To that end, the sequence "Akiyo" has been analyzed. The matrix representing motion bit expenditure associated with the "background" object (Object No.0) of the "Akiyo" sequence, made up of an 11×9 array of macro-blocks, each macro-block consisting of 16×16 array of pixels, would appear as shown below Motion Bit Expenditure
Akiyo: (10 Frames per Second) Object Number 0

| Size 11 × 9 in macro-blocks (Macro-block size 16 × 16) (Background) | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 2 | 0 | 0 | 0 |
| 0 | 0 | 0 | 0 | 0 | 0 | 0 | 0 | 0 | 0 | 0 |
| 0 | 0 | 0 | 2 | 0 | 0 | 0 | 7 | 6 | 0 | 0 |
| 0 | 0 | 4 | 0 | 0 | 0 | 0 | 0 | 0 | 8 | 0 |
| 0 | 2 | 0 | 0 | 0 | 0 | 0 | 0 | 0 | 0 | 0 |
| 0 | 0 | 0 | 0 | 0 | 0 | 0 | 0 | 0 | 0 | 0 |

As would be expected for a "background" object, the complexity of the motion information is low. The average number of bits per macro-block (99 macro-blocks) is 0.31, The output matrix obtained in this case after thresholding would be the same as the input matrix since the threshold value (0.31) is so low. A run length representation of the object, scanning from upper left to lower right, would appear as follows.

40 2 17 2 3 7 0 6 4 4 6 8 2 2 20(Threshold T=0).

In a similar manner, the motion bit expenditure for "Akiyo's Head and Shoulders" (Object No. 1) which is made up of a 9×8 array, would appear as follows.

| Object Number 1 size 9 × 8 (Akiyo's head and shoulders) | | | | | | | | |
|---|---|---|---|---|---|---|---|---|
| 0 | 0 | 0 | 10 | 21 | 15 | 0 | 0 | 0 |
| 0 | 0 | 0 | 4 | 2 | 2 | 0 | 0 | 0 |

-continued

Object Number 1 size 9 × 8
(Akiyo's head and shoulders)

| 0 | 0 | 0 | 22 | 16 | 18 | 4 | 0 | 0 |
|---|---|---|----|----|----|---|---|---|
| 0 | 0 | 0 | 14 | 2  | 4  | 2 | 0 | 0 |
| 0 | 0 | 6 | 4  | 22 | 22 | 2 | 5 | 0 |
| 0 | 4 | 6 | 2  | 2  | 29 | 6 | 0 | 0 |
| 0 | 2 | 0 | 2  | 2  | 2  | 6 | 0 | 4 |
| 0 | 0 | 0 | 0  | 2  | 2  | 2 | 2 | 0 |

The average number of bits per macro-block is 3.77, a significantly larger number than that associated with "background." The matrix after thresholding in this case would appear as follows:

| 0 | 0 | 0 | 10 | 21 | 15 | 0 | 0 | 0 |
|---|---|---|----|----|----|---|---|---|
| 0 | 0 | 0 | 4  | 0  | 0  | 0 | 0 | 0 |
| 0 | 0 | 0 | 22 | 16 | 18 | 4 | 0 | 0 |
| 0 | 0 | 0 | 14 | 0  | 4  | 0 | 0 | 0 |
| 0 | 0 | 6 | 4  | 22 | 22 | 0 | 5 | 0 |
| 0 | 4 | 6 | 0  | 0  | 29 | 6 | 0 | 0 |
| 0 | 0 | 0 | 0  | 0  | 0  | 6 | 0 | 4 |
| 0 | 0 | 0 | 0  | 0  | 0  | 0 | 0 | 0 |

Similarly, the run length representation contains much more data and would appear as follows.

3 10 0 21 0 15 6 4 0 2 0 2 6 22 0 16 0 18 0 4 5 14
0 2 0 4 0 2 4 6 0 4 0 22 0 22 0 2 0 5 2 4 0 6 0 2
0 2 0 29 0 6 1 4 4 2 0 2 0 2 0 2 1 Threshold T = 0.

Corresponding residual bit expenditure for Object No. 0 and Object No. 1 would be as follows.

Residual Bit Expenditure

Object Number 0

| 0 | 0  | 0 | 0 | 0 | 0 | 0 | 0  | 0 | 0 | 0 |
|---|----|---|---|---|---|---|----|---|---|---|
| 0 | 0  | 0 | 0 | 0 | 0 | 0 | 0  | 0 | 0 | 0 |
| 0 | 0  | 0 | 0 | 0 | 0 | 0 | 0  | 0 | 0 | 0 |
| 0 | 0  | 0 | 0 | 0 | 0 | 0 | 13 | 0 | 0 | 0 |
| 0 | 0  | 0 | 0 | 0 | 0 | 0 | 0  | 0 | 0 | 0 |
| 0 | 0  | 0 | 8 | 0 | 0 | 0 | 0  | 0 | 0 | 0 |
| 0 | 0  | 0 | 0 | 0 | 0 | 0 | 0  | 0 | 0 | 0 |
| 0 | 16 | 0 | 0 | 0 | 0 | 0 | 0  | 0 | 0 | 0 |
| 0 | 0  | 0 | 0 | 0 | 0 | 0 | 0  | 0 | 0 | 0 |

Object Number 1

| 0 | 0  | 0 | 5  | 0  | 28 | 0  | 0  | 0 |
|---|----|---|----|----|----|----|----|---|
| 0 | 0  | 0 | 18 | 24 | 22 | 0  | 0  | 0 |
| 0 | 0  | 0 | 69 | 55 | 25 | 14 | 0  | 0 |
| 0 | 0  | 0 | 56 | 96 | 61 | 21 | 0  | 0 |
| 0 | 0  | 0 | 28 | 9  | 26 | 31 | 17 | 0 |
| 0 | 23 | 0 | 7  | 36 | 8  | 19 | 0  | 0 |
| 0 | 16 | 0 | 5  | 63 | 5  | 14 | 0  | 0 |
| 0 | 0  | 0 | 0  | 18 | 47 | 51 | 25 | 0 |

The average bits per macro-block associated with residuals for Object No. 0 is 0.37 and for Object No. 1 is 13.08, The respective run length representations would be as follows.

Object No. 0
40 13 20 8 20 16 20 (Threshold T=0.37)
Object No. 1
5 28 6 18 0 24 0 22 6 69 0 55 0 25 0 14 5 56 0 96 0 61
  0 21 5 28 1 26 0 31 0 17 2 23 2 36 1 19 3 16 2 63 1
  14 6 18 0 47 0 51 0 25 1 (Threshold T=13)

The image "Monitor from News Sequence also has been analyzed.
Monitor from News Sequence (10 Frames per Second) Size 6×5
Motion Complexity Matrix $C_{mv}$

| 0 | 4  | 0  | 4  | 15 | 16 |
|---|----|----|----|----|----|
| 2 | 26 | 7  | 33 | 6  | 20 |
| 0 | 4  | 32 | 0  | 26 | 16 |
| 0 | 0  | 2  | 2  | 26 | 21 |
| 0 | 0  | 0  | 2  | 2  | 0  |

Average Bits/Macro-block=8.86

The Bit Allocation Based Criterion

For each object, construct a "bit rate matrix" which consists of the number of bits required to encode each macroblock. Let $R=\{r(i,j)\}$ and $S=\{s(i,j)\}$ be two rate matrices, then the rate difference between R and S is $$d(R, S) = \sum_{i,j} |r(i, j) - s(i, j)|$$

where r(i,j) is the number of bits required by the $(i,j)^{th}$ macroblock of the object. Given a sequence of rate matrices $R_m$ m=1,2, . . . N+1, we can obtain the normalized rate difference sequence $RP_m$, m=1,2, . . . , N as $$RP_m = \frac{d(R_m, R_{m+1})}{T_m}$$

where $T_m$ is the total number of bits required by the $m^{th}$ object of the sequence $RP_m$. Use a sliding window to process the rate difference sequence $RP_m$ so as to capture local variation. Declare a scene change from $R_i$ to $R_{i+1}$ if
 1. The difference $BP_1$ is the maximum within a symmetric sliding window of size 2 k−1 and
 2. The difference $RP_i$ is also n times the second largest maximum in the sliding window, k=3 and n=2 are used in the examples that are illustrated. The choice of these parameters depends on empirical data as well as frame rate, the frequency of periodic I-frames, etc. Note that the rate difference can be computed only between two I frames/objects or between two P frames/objects. In other words, all the frames in the sequence $R_i$ should all be either I or P frames (objects). Note also that in an MPEG-4 sequence, all the objects need not necessarily be "refreshed" with intra-coding at the same time. a variation can be seen. However, even in the MPEG-2 case, the descriptor according to the present invention enables simple and effective clustering of spatio-temporally similar frames.

TABLE 1

| SEQUENCE | BITS PER MACRO-BLOCK SPENT ON MOTION | COMPLEXITY MEASURE PER MACRO-BLOCK |
|---|---|---|
| Football (720 × 480) | 14 | 3332 |
| Cheerleaders (720 × 480) | 11.3 | 3882 |
| Sprinkle (1920 × 1080) | 30 | 4577 |
| Marching Band (1920 × 1080) | 13.8 | 4317 |

Note that the displacement complexity of the larger MPEG-2 frames (as compared to objects in the MPEG-4 cases) is seemingly higher since higher resolution data gives higher displacement vectors. It is therefore important to retain information as to frame size while making use of the current matching criterion. Note also that the descriptor is applicable to inter-coded-frames, as well as to intra-coded-frames, except that the displacement vector bits are omitted.

The descriptors according to the present invention have been applied mainly to the MPEG-4 test set since it has readily available segmentation into objects. Since objects have more or less homogeneous properties, comparisons making use of the above descriptors regularly yield valid results. Two multi-object MPEG-4 sequences have been compared by using an object to object comparison of similarly located objects. Since the basic displacement compensation information has been used for the descriptor, the results should be readily applicable to any compressed video syntax that uses block displacement compensation coupled with DCT encoding of the residual. Furthermore, since un-segmented frames can also be considered to be composite objects, this approach will also apply to such frames. In that case, descriptors are developed for the sequences by treating the sequences as single objects. Since the characteristics of such "composite" objects are not homogeneous, any comparison with descriptors of individual objects is unlikely to yield valid results. However, comparisons between two sets of frame based descriptors will provide useful results.

This work has also concentrated on MPEG-1 bit rates since a target application would be multi-media databases in which the minimum expected quality is high. The work has also been principally related to full frame rates, i.e. 25 or 30 frames per second. It should be noted that the displacement complexity features would change as a function of frame rate. However, it has been determined that the allocation of bits spent on the displacement vectors does not change significantly, even at lower bit rates. Only the residual bit allocation is significantly affected by changes in bit rate. It has also been found that changes in rate control strategy do not significantly affect the displacement properties, but do significantly change the residual information. These factors have led to a descriptor that emphasizes features based largely on displacement properties. However, residual information is developed and retained because it provides different information that can be useful in certain circumstances. For example, if two objects have the same displacement properties, but with use of the same QP (Quantization Parameter) one object requires more bits for residual encoding than the other, then the former is more spatio-temporally complex than the latter. However, if the quantization step size for one object is equal to or greater than that for another object but the residual encoding bits spent for the second object are less than those for the first object, no conclusion can be drawn regarding the relative spatio-temporal complexity of the two objects. That is, the residual bit allocation does not always provide conclusive information in this regard.

Typical descriptor values are shown for a commonly known set of MPEG-4 objects in FIG. 13. Use of the descriptors can be illustrated by referring to this FIG. 13. The sequence of steps for using the descriptors may take several different forms and can be illustrated by two particular search procedures.

The first and preferred procedure may be identified as a "cascaded" search in which one descriptor feature at a time for the query are compared to narrow the frame or shot set. For instance, assume that in a first stage of the search in which a first feature is employed, 10 frames or shots that "match" the query is obtained from a 100 frames or shots and, in a second search stage using a different descriptor feature 5 frame or shot "matches" are obtained from the 10 frames or shots found in the first stage.

One set of features useful in a cascaded search is the sequence of $C_{mv}^{avg}$ followed by the run-length feature set comprising $N_{ar}$, $N_{mr}$, and $N_{lr}$. The results of matching tests show that the above described descriptor is suitable for locating objects that are similar in motion to a query object. The first stage eliminates the candidates that are considerably different in displacement characteristics, while the second stage eliminates candidates that have the same overall displacement complexity but a different distribution of displacement intensity. The matches sometimes are semantically quite different from the query sequence, but that is to be expected since the MPEG-2/4 based compression complexity of two semantically dissimilar frames can be similar. For instance, a container ship object is close to a head and shoulders of Akiyo in displacement complexity. In that case, the second stage of comparison involving run-length features usually brings semantically similar objects closer, but the difference in texture does set the ship apart from the head and shoulders image. Such a final distinction is made in this case, since an objective of the process is to generate a short list of candidates which can then be processed further by still more sophisticated methods. The present system accomplishes the desired result.

Figure 12:
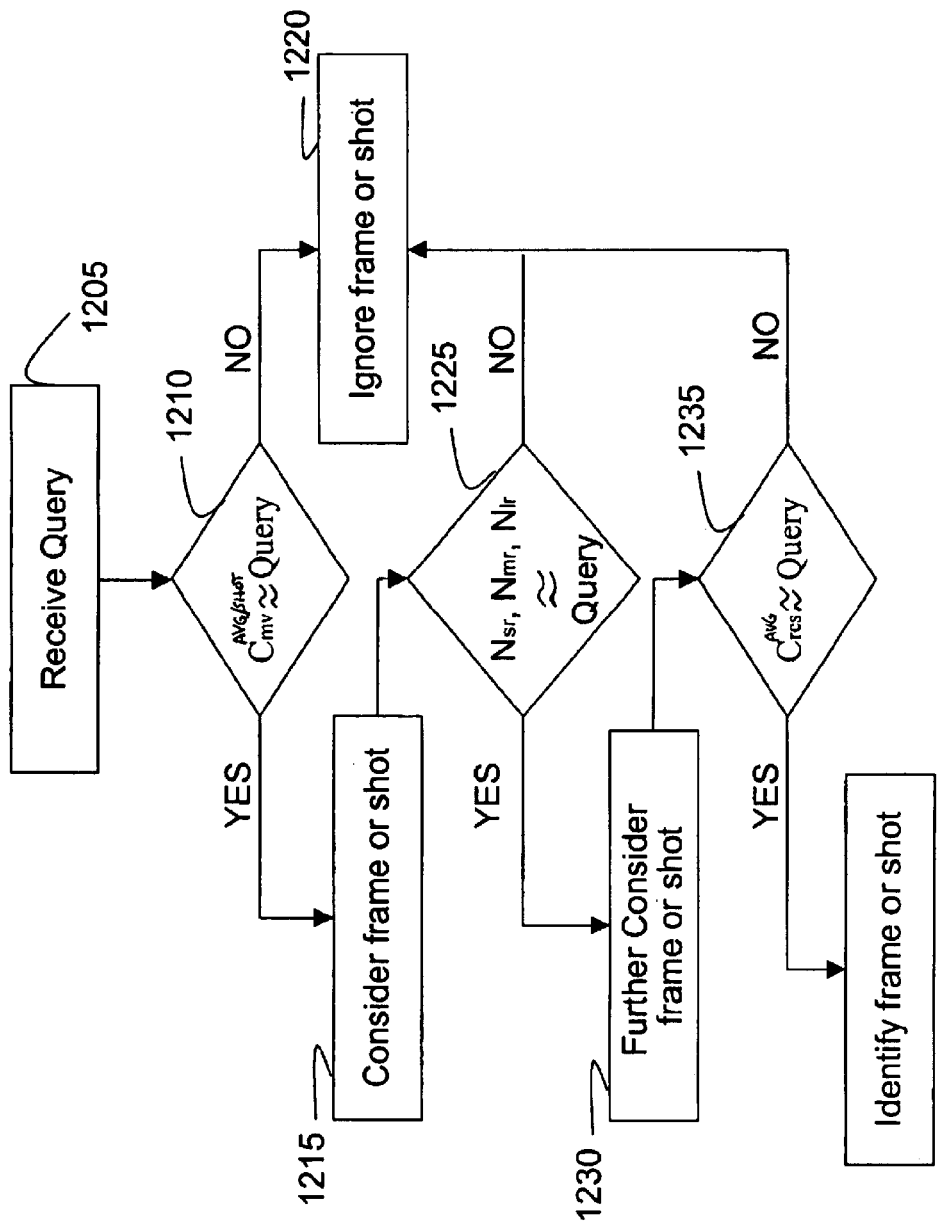
FIG. 12 is a flow chart of further operations which are performed by the processing system of FIG. 9 to identify a frame or shot matching a query in accordance with the present invention.

FIG. 12 is a flow chart of the operations performed by the processing system 900 in matching a query to the appropriate frame or shot represented in the compressed video bit-stream 100, In step 1205, a query is received via the I/O port 940 and transmitted via bus 930 to the processor 910, The processor in accordance with the programming 920a stored on memory 920 retrieves the descriptors stored in the database 920b and compares the average number of displacement vector bits per macro-block for each frame or shot with the query in step 1210, It should be noted that if the query includes a compressed video bit-stream, the processor may perform some or all of the previously described operations to construct a descriptor for the query to compare with the previously constructed descriptors stored in the database 920b in order to identify a matching frame or shot. In any event, those frames or shots which have an average number of displacement vector bits per macro-block which compare favorably with the query are considered for further analysis as indicated in step 1215, The other frames, as reflected in step 1220, are ignored.

In step 1225, one or more of the run-lengths of the potentially matching frames are compared with the query. Those frames having a number of run-lengths within the applicable category or categories which favorably compare with the query are, as indicated in step 1230 identified for further processing, while the other frames are ignored. In step 1235, the processor 910 further considers the average number of residual bits for those frames still in consideration with respect to the query. That frame or shot having the closest matching average number of residual bits in its descriptor is identified as the best match to the query. A list of matching frames could thus formed in descending order of similarity.

Specific examples of first and second stage matching, using techniques according to the present invention in connection with various MPEG-4 Objects are shown in Tables 2, 3 and 4 below.

TABLE 2

| Target Object and Objects in Descending Order of Similarity | Average Motion Vector Bit Expenditure per Macro-block |
| --- | --- |
| Akiyo-Head and Shoulders | 1.77 |
| Container Ship-Flag | 2.0 |
| Coastguard-Motor Launch | 2.0 |
| Container Ship-Ship | 1.16 |
| News-News Readers | 1.1 |
| Akiyo-Full | 0.87 |

TABLE 3

| Target Object and Objects in Descending Order of Similarity | Most Common Run Length Category | Frequency of Most Common Run Length Category |
| --- | --- | --- |
| Akiyo Head and Shoulders | Short | 5 |
| Akiyo Full | Short | 5 |
| Container Ship-Ship | Short | 5 |
| News-News Readers | Short | 4 |
| Flag | N/A | |

TABLE 4

Second Stage Matching

| Target Object and Objects in Descending Order Of Similarity to Target Object | Average Motion Bit Expenditure per Macro-block |
| --- | --- |
| Akiyo -Still Background | 0.22 |
| News-Still Background | 0.2 |
| Container Ship-Foreground (Flagpole) | 0.12 |
| Container Ship-Still Background (Sky) | 0.4 |
| News-Text Overlay | 0.0 |
| Container Ship-Small Boat | 0.8 |

A second search procedure uses weighted combinations of the descriptor features for making comparisons. The particular weights to be given to different features involve complex considerations because of differences in the nature and scale of the features. The weighting procedure uses a simple normalization technique to combine the field by field differences between the test and query descriptors. It consists of dividing the difference in each field by the value of the corresponding field in the query descriptor. The resulting normalized differences are then added to get the total difference between the query descriptor and the test descriptor.

The above descriptor is also useful as an intermediate MPEG-7 descriptor which can be applied by a relatively simple apparatus to facilitate computation of higher level MPEG-7 descriptors on a smaller data set by a more complex apparatus.

As a further step in employing the foregoing techniques, temporal segmentation markers may be generated and are associated with the in-put video sequence to locate and identify particular types of scene changes. Thereafter, features of the video sequence may be extracted according to the present invention.

To summarize, descriptors are constructed based on the number of bits required for encoding the displacement vectors and the residuals of each macro-block in the object/frame. The displacement vector and residual compression complexity matrices are made as independent of the bit rate as possible. The average number of bits spent on displacement vectors per macro-block of the frame can be calculated. This average is a useful measure of the displacement complexity of the frame. At low bit rates with MPEG-4, this average provides an easy distinction between still and moving objects. The average compression complexity of the residual per macro-block of the frame is also useful in classifying and/or matching frames. Frame run-lengths are especially useful at low bit rates which force many elements to be zero. A scan order is preferably used to determine, but any other order can be used. The run-length structure is represents the shape of the spatial distribution of the compression complexity in a simple way. Thresholding is used prior to determining run-lengths, in which all elements lower than a specified threshold are set to zero. The threshold is preferably supplied as part of the descriptor. A descriptor is thereby developed for each frame of a sequence.

A descriptor for a shot is developed by first segmenting the video sequence temporally into shots, preferably using any known scene change detection techniques. The frame descriptor of the frame of the shot which falls within a group of frames closest to an average of all frames within the shot is used as the descriptor for the shot. The first few frames may be skipped in determining the shot average to let the rate control settle down from a scene transition.

The average bit expenditure on displacement vectors per macro-block, as well as the average compression complexity per macro-block can serve as matching criteria that help rank the candidates. The run-length information in each representation then can be used to further rank the candidates. Thereafter, equally indexed run-lengths are compared, i.e. compare the run-lengths of short, intermediate and long lengths of the frames with the corresponding run-lengths of the query frame. Although the invention has been described above in terms of matching of single frames or shots from diverse sources, it should be recognized that it is within the scope of the present invention to apply the foregoing techniques to collections of shots. For example, an action movie would have several high motion complexity shots in a row while a more sedate movie would have a number of low spatio-temporal complexity shots in a row. These characteristics could be logged and used to provide matching criteria for entire movies. It should also be noted that the sequence of steps as set forth above do not necessarily occur in close time proximity to each other but may, in fact, be separated in time. In particular, the descriptor can be developed and stored and, at a later time, it may be used to find matches.

The macro-blocks of inter-coded frame data, i.e. encoded P or B frame data, also consist of matrices of DCT coefficients. However, these coefficients represent the differences between a predicted 8×8 pixel matrix and the actual 8×8 pixel matrix.

Although the above described descriptor provides good results when all bit-streams and queries correspond to the same encoding standard, the descriptor provides less satisfactory results if the bit-streams and/or queries correspond to different encoding standards.

Hence, according to a second embodiment of the invention, a further descriptor for spatial distribution of displacement activity in video sequences which is more robust than the previously discussed descriptor will be described further below. This magnitude descriptor uses the magnitude of the motion vectors as a measure of the intensity of displacement activity in a macro-block. A matrix $C_{mmv}$ is constructed by using bits of the compressed bit-stream 100 which represent the magnitude of the displacement vector for each macro-block of a given frame. The average magnitude of the motion vector per macro-block, $C_{mmv}^{avg}$ is computed. $C_{mmv}^{avg}$ is used as a threshold on the matrix $C_{mmv}$ by setting the magnitude represented by the elements of $C_{mmv}$ that are less than $C_{mmv}^{avg}$ to zero. The runs of zeroes are classified into three categories based on length as previously described. The number of runs of each category in the matrix $C_{mmv}$ is computed. The descriptor for each frame then consists of only four parameter, viz the average magnitude of the displacement vectors and the numbers of runs of short, medium and long lengths. Since the feature extraction remains in the compressed domain and simple, it is extremely fast. Based upon tests on the MPEG-7 test content set, the magnitude descriptor enables fast and accurate indexing of video. It is robust to noise and changes in encoding parameters such as frame size, frame rate, encoding bit rate etc.

More particularly, for each inter-coded frame an "activity matrix" $C_{mmv}$ is constructed as follows:

$$C_{mmv} = \{R(i,j)\} = \sqrt{x_{i,j}^2 + y_{i,j}^2} \quad (3)$$

where $(x_{i,j}, y_{i,j})$ is the magnitude of the displacement vector associated with the (i,j)th block.

For intra-coded frames, $R(i,j)=0$, The average motion vector magnitude per macro-block of the frame $C_{mmv}^{avg}$ is computed by:

$$C_{mmv}^{avg} = \frac{1}{MN} \sum_{i=0}^{M} \sum_{j=0}^{N} C_{mmv}(i, j) \quad (4)$$

Figure 14:
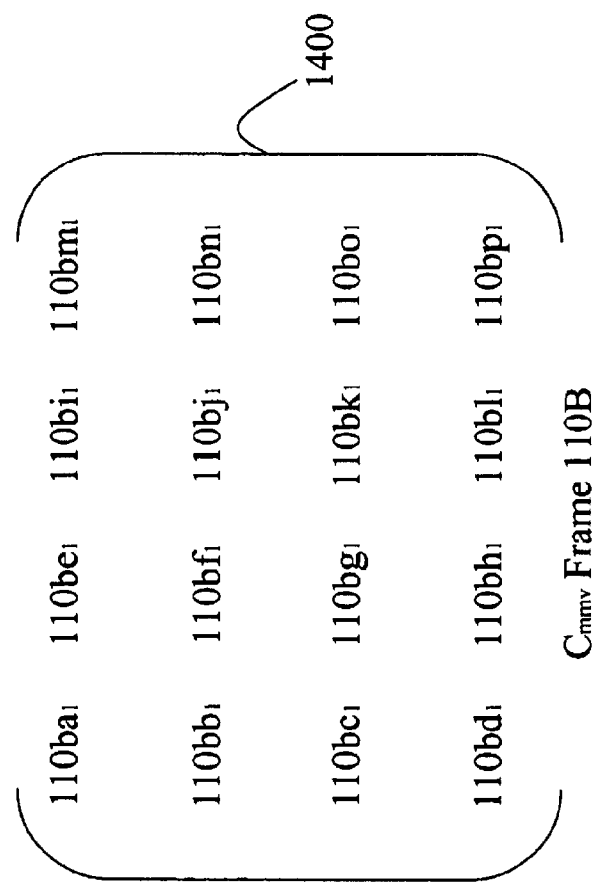
FIG. 14 depicts a compression complexity matrix for a frame represented in the compressed bit-stream of FIG. 1 in accordance with a second embodiment of the present invention.

FIG. 14 depicts the displacement vector magnitude matrix 1400 in accordance with the second embodiment of the present invention for frame 110B. As shown, the matrix includes the actual bits $110ba_1$–$110bp_1$, representing the magnitudes of the displacement vectors in the compressed bit-stream 100 for macro-blocks 110ba–110bp.

The "run-length" features of the motion vector rate matrix are computed using $C_{mmv}^{avg}$ as a threshold on $C_{mmv}$ as follows:

$$C_{mv}^{thresh}(i, j) = \begin{cases} C_{mv}(i, j), & \text{if } C_{mv}(i, j) \geq C_{mv}^{avg} \\ 0, & \text{otherwise} \end{cases} \quad (5)$$

As previously described, the lengths of runs of zeroes in the matrix are computed using a raster-scan order. The run-lengths are classified into three categories, short, medium and long that are normalized with respect to the frame width. For example, the categories could be defined to have the short runs to be ⅓ of the width or lower, the medium runs to be greater than ⅓ the width and less than ⅔ of the width, and the long runs to be all runs that are greater than or equal to ⅔ the width. $N_{ar}$ is the number of short runs, $N_{mr}$ is the number of medium runs, and $N_{lr}$ is the number of long runs.

Figure 15A:
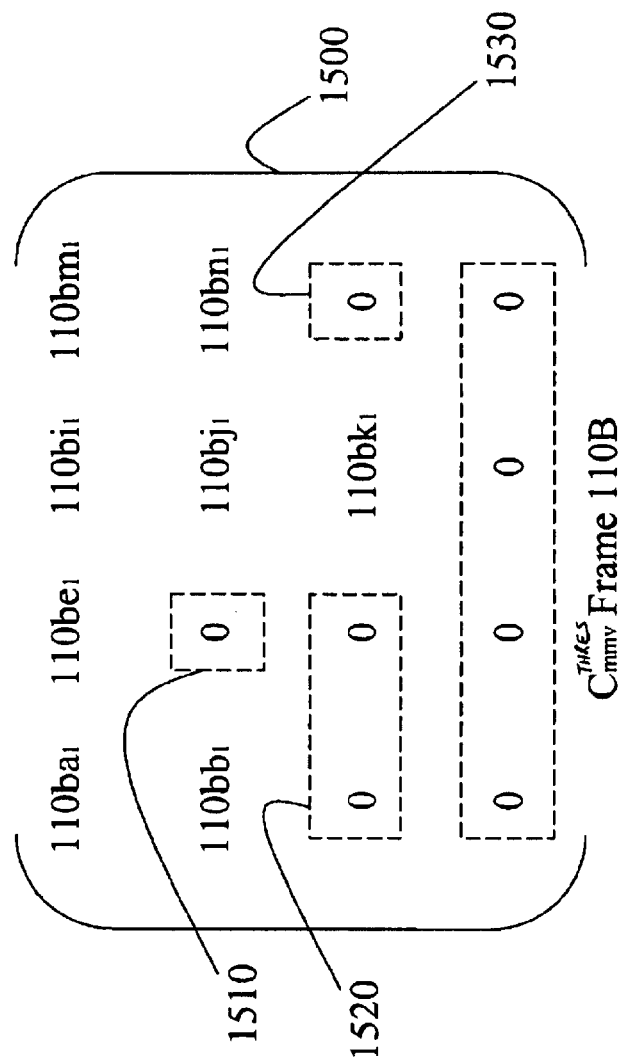
FIG. 15A represents run-lengths for the frame represented by the compression complexity matrix of FIG. 14.

As shown in FIG. 15A, the threshold matrix $C_{mmv}^{thresh}$ 1500 for frame 110B has a number of the elements set to zero. The resultant run-lengths 1510, 1520 and 1530 respectively represent run-lengths of 1, 2 and 5 zero elements. Accordingly, run-length 1510 is categorized as a short run-length, run-length 1520 is categorized as a medium run-length, and run-length 1530 is categorized as a long run-length.

Figure 15B:
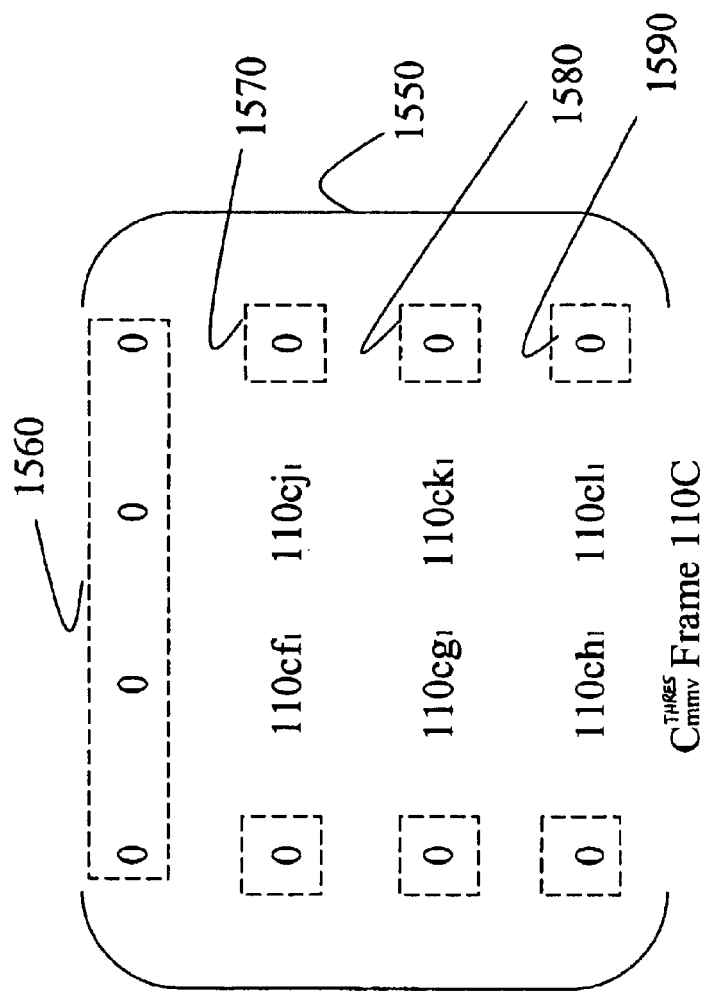
FIG. 15B represents run-lengths for other frames represented in the compressed bit-stream of FIG. 1 in accordance with the second embodiment of the present invention.

FIG. 15B represents the thresholded matrix $C_{mmv}^{thresh}$ 1550 for frame 110C. Here to, a number of the elements of the matrix representing the magnitudes of the displacement vectors for each macro-block of the frame have been set to zero resulting in run-lengths 1560, 1570, 1580 and 1590, Run 1560 has a length of 5, runs 1570 and 1580 have run-lengths of 2 and run 1590 has a run-length of 1, Accordingly, run-length 1560 is categorized within the long range, run-lengths 1570 and 1580 are categorized within the medium run-lengths, and run-length 1590 is categorized in the short range. Thus there is one run-length in the long range, two run-lengths in the medium range, and only a single run-length in the short range as shown in FIG. 15B.

The descriptor is constructed to have a structure consisting of $C_{mmv}^{avg}$, $N_{ar}$, $N_{mr}$, $N_{lr}$. Note that the descriptor indirectly expresses the number and size of distinct moving objects in the frame and their distribution across the frame. For a frame with a single large object such as a talking head, the number of short run-lengths is likely to be high, whereas for a frame with several small objects such as an aerial shot of a soccer game the number of short run-lengths is likely to be lower.

Figure 16:
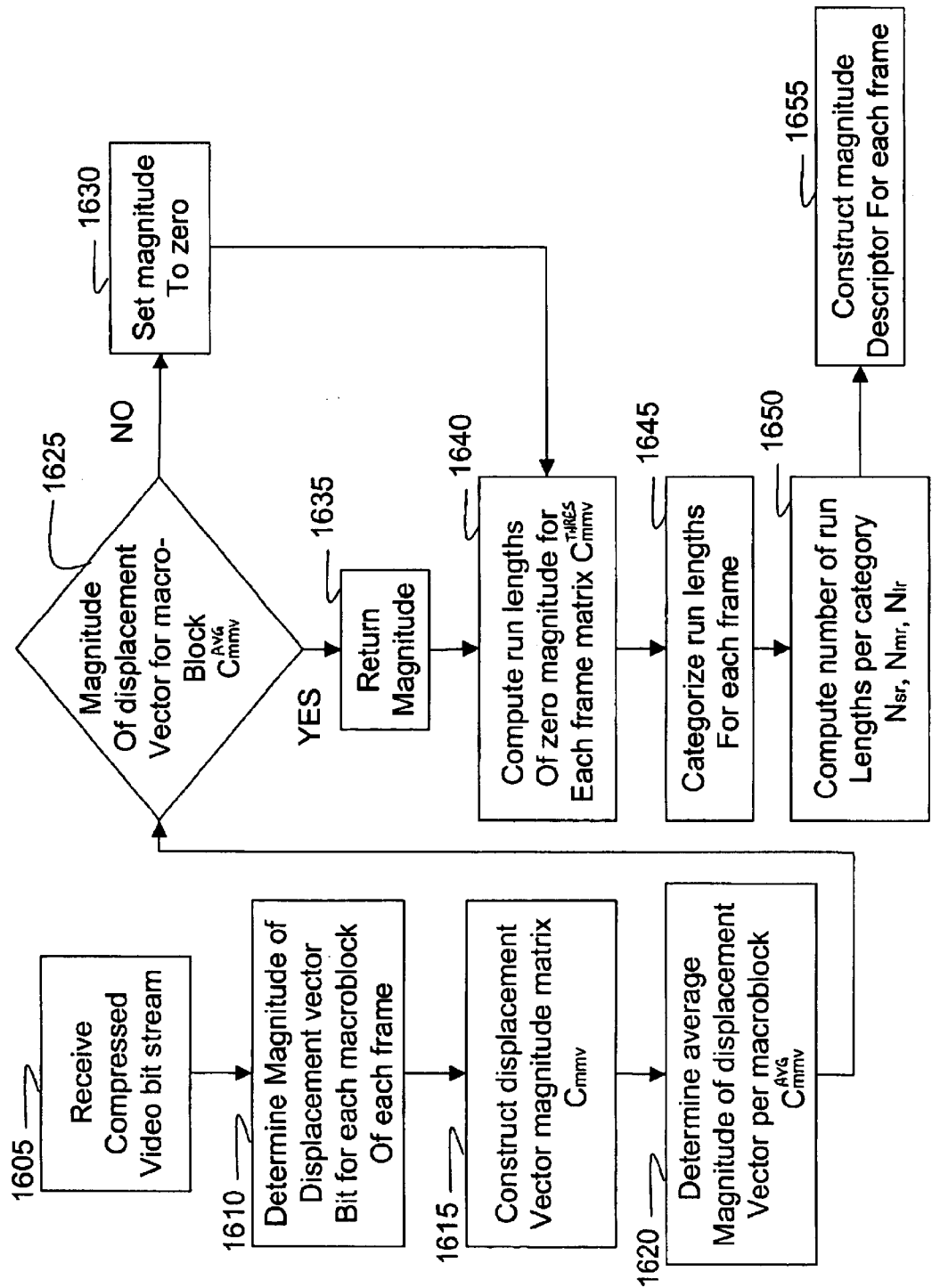
FIG. 16 is a flow chart of operations which are performed by the processing system of FIG. 9 in accordance with the second embodiment of the present invention.

Referring to FIG. 9, the processing system 900 is easily adapted for creating and using the magnitude descriptor of the second embodiment of the present invention. More particularly and with reference to FIG. 16, the programming 920a is configured such that the system 900 can receive, as indicated in step 1605, the compressed video bit-stream 100 via I/O port 930, The processor 910 determines the magnitude of the displacement vector per macro-block for each frame based upon the applicable bits in the compressed bit-stream as reflected in step 1610, The processor 910 then constructs a displacement vector magnitude matrix $C_{mmv}$ for each of the applicable frames in step 1615, In step 1620, an average magnitude $C_{mmv}^{avg}$ is determined by the processor 910 for the displacement vectors per macro-block of the applicable frame.

The magnitude of the displacement vector for each macro-block, e.g. $110ba_1$–$101bp_1$, is then compared to the average magnitude per macro-block $C_{mmv}^{avg}$ to determine those magnitudes which are less than the average magnitude per macro-block, i.e. the threshold, across the frame in step 1625, In step 1630, those magnitudes which do not equal or exceed the threshold are set to zero. As indicated in step 1635, the remaining magnitudes are retained. In step 1640, a threshold matrix $C_{mmv}^{thresh}$ is constructed. The run-lengths of zero magnitude elements within the matrix are computed by the processor 910 in step 1640, The run-lengths are then categorized by the processor 910 in step 1645, The number of run-lengths per category are computed in step 1650, In step 1655, the descriptor is constructed using the determined average magnitude of displacement per macro-block and the run-lengths in each of the categories for each frame. The descriptors can then be directed by the processor 910 to the memory 920 via the bus 930 for storage in the database 920b.

A descriptor for a shot can be constructed by computing the descriptors of all the inter-coded frames in the shot and computing the average displacement vector magnitude per macro-block $C_{mmv}^{shot}$ on displacement vectors for the entire shot. The frame with $C_{mmv}^{avg}$ closest to $C_{mmv}^{shot}$ is identified. Alternatively, the median $C_{mmv}^{med}$ of the $C_{mmv}^{avg}$ values over all the inter-coded frames of the shot can be computed and the frame having $C_{mmv}^{avg}$ closest to $C_{mmv}^{med}$ is identified and its descriptor is used as the shot descriptor. In a still further alternative, an inter-coded frame is identified at random from the shot and its descriptor is used as the shot descriptor. Another alternative is to find the average or median of each of the four descriptor parameters, and then form the shot descriptor using the resulting average or median values of each of the four descriptor parameters. In this letter case, an arbitrarily chosen frame of the shot could be identified based on the average or medium values.

Figure 17:
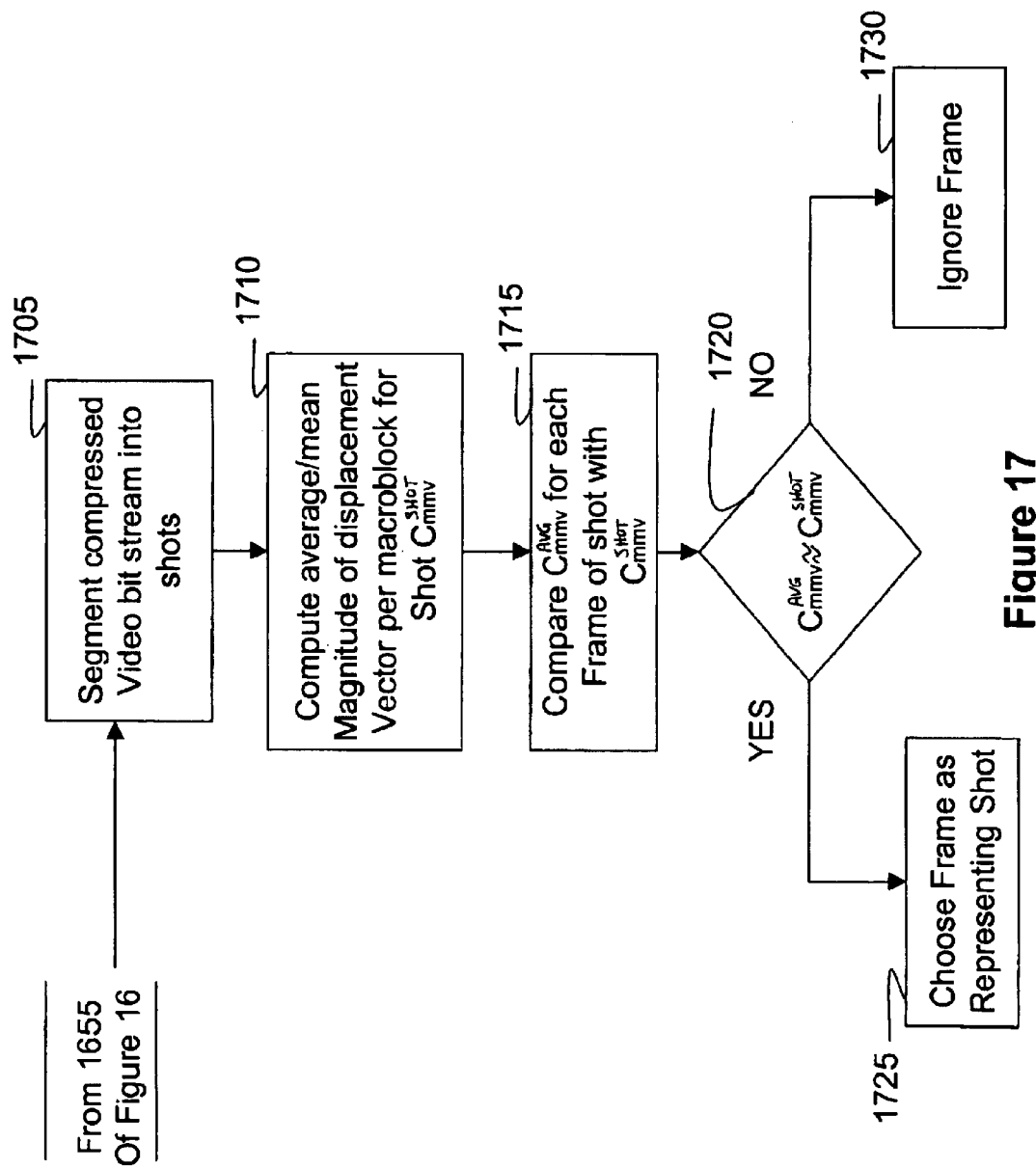
FIG. 17 is a flow chart of further operations which are optionally performed by the processing system of FIG. 9 in accordance with the second embodiment of the present invention.

Referring to FIGS. 9 and 17, if desired, the processor 910 can segment the compressed video bit-stream 100 into shots, as indicated in step 1705, A computed average or mean magnitude of the displacement vectors per macro-block $C_{mmv}^{shot}$ over all the frames of the shot is then computed in step 1710, The average magnitude per macro-block for each frame of the shot is compared, in step 1715, with the average or mean shot magnitude. As reflected in step 1720, the processor 910 determines, based upon the comparison, which of the average magnitudes per macro-block compare favorably with the average or mean magnitude per macro-block for the entire shot. The frame having the closest matching average magnitude per macro-block is chosen, in step 1725, to represent the shot. The other frames are ignored as indicated in step 1730, Here again the processor 910 can direct the descriptor for the chosen frame to the database 720b for storage as the descriptor of the entire shot.

Once the frame or shot descriptor has been constructed, the "distance" $D(S,S_a)$ between a query frame or shot $S_a$ and a described frame or shot S, can be computed as follows:

$$W_{tot} = C_{mmv}^{avg}(S_a) + N_{sr})(S_a) + N_{mr}(S_a) + l_r(S_a) \quad (6)$$

$$D(S, S_a) = \quad (7)$$
$$\frac{W_{tot}}{C_{mmv}^{avg}(S_a)} |C_{mmv}^{avg}(S_a) - C_{mmv}^{avg}(S)| + \frac{W_{tot}}{N_{sr}(S_a)} |N_{sr}(S_a) - N_{sr}(S)| +$$
$$\frac{W_{tot}}{N_{mr}(S_a)} |N_{mr}(S_a) - N_{mr}(S)| + \frac{W_{tot}}{N_{lr}(S_a)} |N_{lr}(S_a) - N_{lr}(S)|$$

Alternatively, a "cascaded" search, as previously described, in which one descriptor feature at a time is used to successively refine the search with the other features can be performed. The cascaded procedure is slower but sometimes yields slightly higher accuracy. Both these procedures attempt to normalize the individual features, while preserving simplicity of extraction and matching. While good results are obtained with these search procedures, other more formal methods of normalization, such as using Mahalanobis distance, which account for the correlation between the run-length features may be advantageously used in certain implementations.

Figure 18:
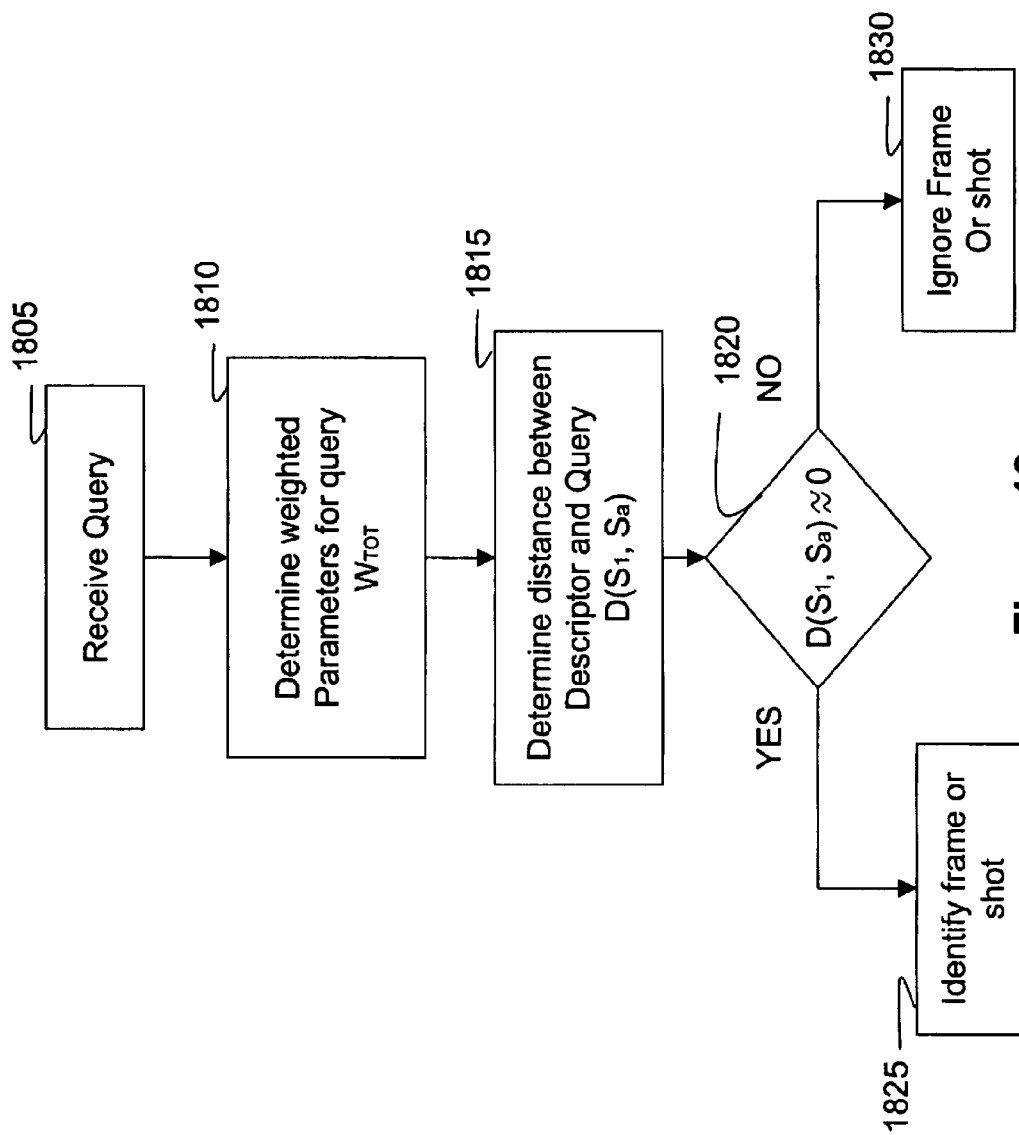
FIG. 18 is a flow chart of further first alternative operations which are performed by the processing system of FIG. 9 to match a frame or shot to a query in accordance the second embodiment of the present invention.

Referring now to FIGS. 9 and 18, using one of the alternative matching techniques, the processor 910 in accordance with programming 920 a receives a query in step 1805 via the I/O port 940 and bus 930, The processor 90 determines the weighted parameters W for the query in step 1810, The descriptors are retrieved by the processor 910 from the database 920b and the distance between the descriptor and query is determined in step 1850, In step 1820, the processor 910 identifies the smallest distance between a descriptor and the query. The frame or shot having the smallest distance descriptor is identified in step 1825 as the best match to the query. As indicated in step 1830, the other frames are ignored.

Figure 19:
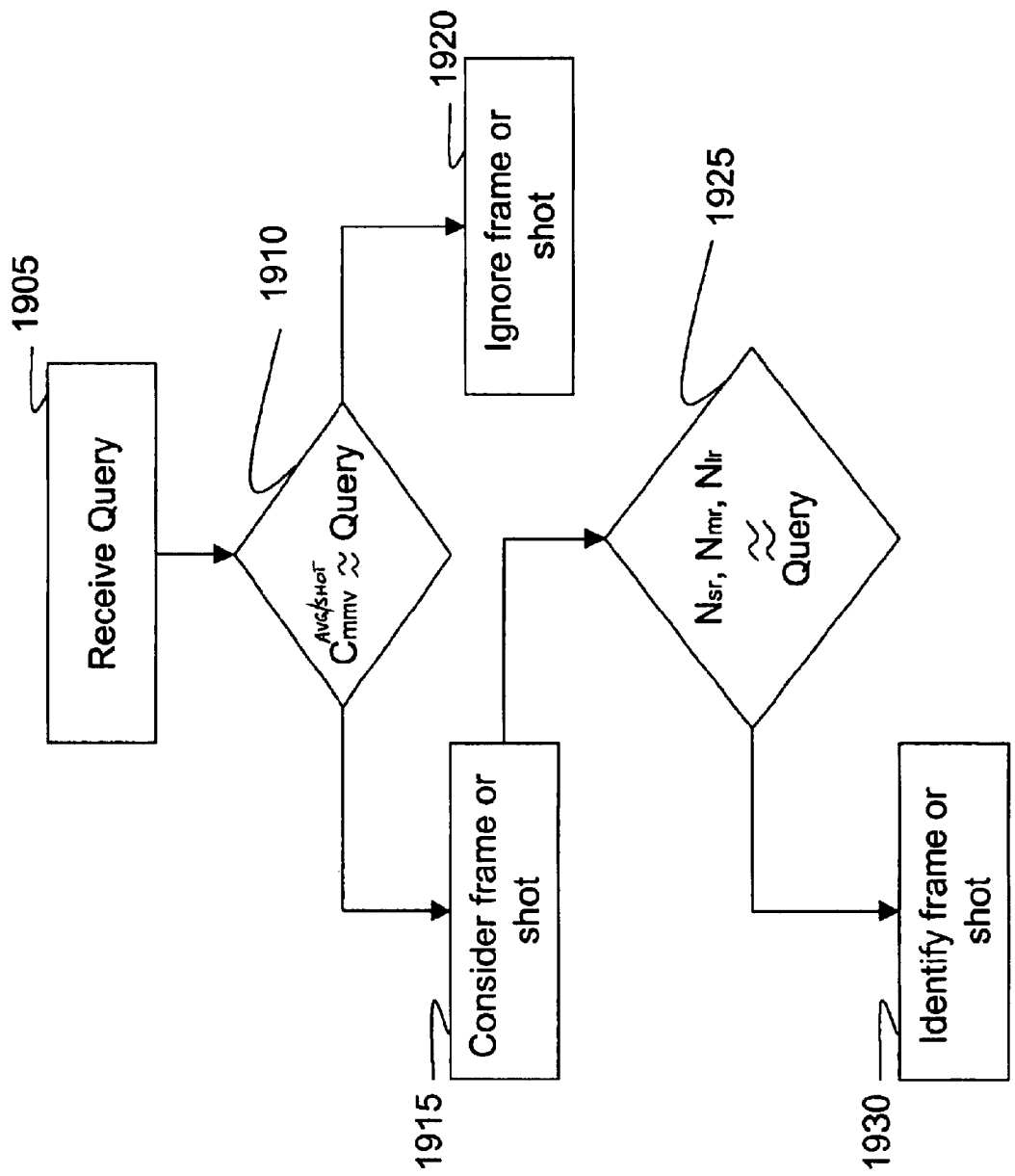
FIG. 19 is a flow chart of second alternative operations which are performed by the a processing system of FIG. 9 to match a frame or shot with a query in accordance with the second embodiment of the present invention.

Referring to FIGS. 9 and 19, in an alternative query match operation the processor 910, in accordance with programming 920a, receives a query in step 1905 via the I/O port 940 and bus 930, In step 1910, the descriptors are retrieved from the database 920b and the average magnitude per macroblock for the frame or shot, as applicable, is compared to the query to identify those average magnitudes which most favorably match with the query. In step 1915, those frames or shots associated with the most favorably matching average magnitudes are identified for further processing. The other frames or shots are ignored, as indicated in step 1920, In step 1925, the processor 910 determines if the number of run-lengths in one or more of the run-length categories for the identified frames or shots favorably matches with the query requirements. The frame or shot associated with the closest matching number or numbers of run-lengths is identified, in step 1930, as the closest matching frame or shot. The other frames or shots are ignored, as indicated in step 1920, As mentioned a list of matching shots could thus be formed in a descending order of similarity.

The magnitude descriptor has been applied to MPEG-1 video sequences of the entire MPEG-7 test set by computing frame descriptors. The improved descriptor enables semantic shot classification and matching within a movie or other program. The values of precision obtained consistently range from 1/10 to 3/5 within a program. For example, with the item V2 (Portuguese TV news) 3/5 precision is obtained when searching for the news anchor. However, when searching for the soccer shots the precision goes down to 1/10, Note that the recall with the soccer sequence is 1/2 while the recall with the news anchor is less than 0.01, The results with the test content indicate that magnitude descriptor is able to match shots with similar spatio-temporal activity. If within the same program, the semantic classes are widely separated in terms of intensity and distribution of spatio-temporal activity, the magnitude descriptor performs well. While sports and news are good examples of such content, other content also lends itself to such indexing Matching across programs is feasible though slightly less successful than matching within programs. The difference in noise levels of content slightly affects the accuracy of the matching across programs. Moreover, within a program the magnitude descriptors for frames are within a semantic context and hence give semantic matches. Across programs, the matching procedure makes more of a non-semantic low level match. For instance, a match across a mixture of a quiz show, drama and the basketball game is attempted, the quiz show gets overwhelmed by matches from the drama, which is correct in the non-semantic sense since it is the spatio-temporal characteristics that are being directly measured. Since the basketball game is much higher in intensity of activity, it is not affected by the quiz or the drama. Indexing the quiz show by itself, the magnitude descriptor is able to classify the frames into semantically similar categories such as close-ups of individuals, all three contestants; etc.

Testing of the magnitude descriptor has also concentrated on MPEG-1 bit-rates since a target application is multimedia databases in which the minimum expected quality is high. Therefore full frame rates i.e. 30 or 25 frames per second have also been used in testing. The average magnitude of the motion vectors is easy to normalize with respect to frame-rate and frame-size, as are the run-length features. The motion vector properties do not change significantly with bit rate. Changes in rate control strategy also do not significantly affect the motion properties. Thus the magnitude descriptor is robust to changes in encoding parameters, which is important for compressed domain feature extraction.

The magnitude descriptor is effective in indexing within and across programs, e.g. movies. Since it is a low-level descriptor that is easy to extract and match, it is beneficially used in combination with other descriptors for video indexing. Features for an hour of content can be extracted in about ten minutes on a 333 MHz PC with non-optimized code. Since only four parameters and an absolute distance are used, the matching complexity is also low. Clustering strategies may, in certain implementations enable further reduction in the searching complexity from the current complexity. Such clustering will facilitate multi-level representation of a video sequence. Since the magnitude descriptor is frame-based, it can be easily extended to describe shots, collections of shots etc. It is also useful for other applications such as content based processing, intelligent multimedia presentation, surveillance etc.

Since the magnitude descriptor is a low level and simple descriptor, it does not carry out semantic matches. The values of the precision and recall described above are based on exact semantic matches which is perhaps too strong a criterion for a low level descriptor. For example, if the criterion were to only retrieve talking heads and not the news anchor, the precision value would go up to ⅗, The purpose of the magnitude descriptor is primarily to provide a simple initial classification of the program so a subsequent classification could be made by a complementary descriptor such as color, or by a more sophisticated descriptor of a related feature such as motion. However, in some implementations the magnitude descriptor could be used for final classification.

Specific examples of magnitude descriptors for shots having various MPEG-1 objects are set forth in Table 5 below.

TABLE 5

| Name | Representative Frame Number | Description of event/action | $C_{mmv}^{avg}$ average motionvector magnitude/MB for motion | $N_{sr}$ Short run-lengths | $N_{mr}$ Medium run-lengths | $N_{lr}$ Long run-lengths |
|---|---|---|---|---|---|---|
| Basketball V17 | 2094 | Fast pan from a distance | 40.4 | 57 | 5 | 0 |
| Basketball V17 | 15675 | Zoom in from a distance | 13.7 | 19 | 3 | 6 |
| News V3 (news1) Spanish TV | 36580 | Soccer - distant shot showing one side of the field with players | 3.18 | 43 | 6 | 2 |
| News V3 (news1) | 1159 | Newsanchor | 1.4 | 26 | 10 | 4 |
| News V1 (jornaldanoite1) Portugese TV | 10002 | Newsanchor | 3.4 | 13 | 9 | 7 |

What is claimed is:

1. A method for identifying a frame represented in a compressed bit-stream corresponding to a sequence of intra-coded frames and inter-coded frames, the compressed bit-stream including respective bits associated with each of the inter-coded frames representing a displacement from the associated inter-coded frame to a closest matching of the intra-coded frames, comprising the steps of:
   determining a magnitude of the displacement of a first of the inter-coded frames based on the bits in the compressed bit-stream associated with the first inter-coded frame; and
   identifying the first inter-coded frame based upon the determined displacement magnitude, wherein the determined displacement magnitude is indicative of one of a scene change within the first inter-coded frame, and an object within the first inter-coded frame;
   entropy decoding the compressed bit-stream;
   wherein the magnitude of the displacement of the first inter-coded frame is determined from the entropy decoded compressed bit-stream; and
   wherein the first inter-coded frame includes a plurality of macro-blocks;
   each of the macro-blocks is associated with a respective portion of the bits associated with the first inter-coded frame which represents a magnitude of displacement from the associated macro-block to the closest matching intra-coded frame;
   the displacement magnitude of the first inter-coded frame is determined by computing an average displacement magnitude per macro-block based on the respective portions of bits in the compressed bit-stream associated with each of the plurality of macro-blocks in the first inter-coded frame; and
   the determined displacement magnitude is the computed average displacement magnitude.

2. A method according to claim 1, further comprising the steps of:
   determining, for each of the plurality of macro-blocks, if the displacement magnitude associated with the macro-block is less than a threshold; and
   computing a value corresponding to run lengths for those of the plurality of macro-blocks having the displacement magnitude less than the threshold;
   wherein the first inter-coded frame is further identified based on the computed value.

3. A method according to claim 2, further comprising the step of:
   normalizing the computed average displacement magnitude and the computed value based on at least one parameter used to encode the compressed bit-stream.

4. A method according to claim 3, wherein the at least one parameter is at least one of a frame format, a frame size, a frame rate and a bit rate.

5. A method according to claim 2, wherein the threshold is the computed average displacement magnitude.

6. A method according to claim 2, wherein the computed value is one of a plurality of values corresponding to run lengths of those of the plurality of macro-blocks having the displacement magnitude less than the threshold, and further comprising the step of:
   categorizing each of the run lengths in one of a plurality of categories, each of the plurality of categories corresponding to a different run length range;
   wherein each of the plurality of values corresponds to run lengths categorized in a respective one of the plurality of categories, and the first inter-coded frame is further. identified based upon the plurality of values.

7. A method according to claim 2, further comprising the steps of:
- combining the computed average displacement magnitude and the computed value;
- wherein the first inter-coded frame is identified based on the combined average displacement magnitude and value.

8. A method according to claim 1, wherein the video sequence includes shots formed of respective series of adjacent of the inter-coded frames, a first of the shots is formed of a first of the series of adjacent inter-coded frames which includes the first inter-coded frame, each of the inter-coded frames includes a plurality of macro-blocks, each of the macro-blocks is associated with a respective portion of the bits associated with its inter-coded frame which represents a magnitude of displacement from the macro-block to a closest matching of the intra-coded frames, and further comprising the steps of:
- computing an average magnitude of displacement per macro-block for each of the adjacent inter-coded frames forming the first shot based on the respective portions of bits associated with the plurality of macro-blocks of that inter-coded frame;
- computing an average magnitude of displacement per frame for the first shot based on the computed average displacement magnitude per macro-block of each of the adjacent inter-coded frames of the first shot;
- comparing the computed average displacement magnitude per macro-block of each of the adjacent inter-coded frames forming the first shot to the computed average displacement magnitude per frame of the first shot; and
- selecting the computed average displacement magnitude per macro-block of the first inter-coded frame as representative of the shot based on the comparison;

wherein the determined displacement magnitude is the selected average displacement magnitude per macro-block of the first inter-coded frame.

9. A method according to claim 1, further comprising the step of:
- normalizing the determined displacement magnitude of the first inter-coded frame based on a width and height of the first inter-coded frame.

10. A method for identifying a frame in a compressed video bit-stream corresponding to a video sequence having intra-coded and inter-coded frames, each of the inter-coded frames having a plurality of macro-blocks, the compressed bit-stream including bits associated with each of the inter-coded frames representing (i) a magnitude of displacement of the associated inter-coded frame to a closest matching of the intra-coded and (ii) a number of run lengths of those of the plurality of macro-blocks of the associated inter-coded frame having a displacement magnitude to a closest matching of the intra-coded equaling less than a threshold, comprising the steps of:
- identifying a first and a second of the inter-coded frames based on the displacement magnitude of the first inter-coded frame and the displacement magnitude of the second inter-coded frame; and
- identifying only one of the identified first and second inter-coded frames based on the number of run lengths of macro-blocks associated with the first inter-coded frame and the number of run lengths of macro-blocks associated with the second inter-coded frame.

11. A method according to claim 10, wherein:
the number of run lengths associated with each of the inter-coded frames is one of multiple numbers of run lengths of macro-blocks associated with that inter-coded frame having a displacement magnitude to the closest matching intra-coded frame equaling less than the threshold;
each of the multiple numbers of run lengths is associated with a respective one of multiple run length ranges; and
the one inter-coded frame is identified based on the number of run lengths of macro-blocks associated with that inter-coded frame in each of the multiple run length ranges.

12. A method according to claim 10, further comprising the step of:
- comparing a frequency of occurrence of the number of run lengths of macro-blocks associated with the first inter-coded frame with a frequency of occurrence of the number of run lengths of macro-blocks associated with the second inter-coded frame;
- wherein the one inter-coded frame is identified based on a difference between the frequency of occurrence associated with the first inter-coded frame and the frequency of occurrence associated with the second inter-coded frame.

13. A system for identifying a frame:
- a memory configured to store a compressed bit-stream corresponding to a sequence of intra-coded frames and inter-coded frames, the compressed bit-stream including bits associated with each of the inter-coded frames representing a displacement from the associated inter-coded frame to a closest matching of the intra-coded frames; and
- a processor configured to determine a magnitude of the displacement of a first of the inter-coded frames based on the bits in the compressed bit-stream associated with the first inter-coded frame, and to identify the first inter-coded frame based upon the determined displacement magnitude, wherein;
  - the first inter-coded frame includes a plurality of macro-blocks;
  - each of the macro-blocks is associated with a respective portion of the bits associated with the first inter-coded frame in the stored compressed bit-stream which represents a magnitude of displacement from the associated macro-block to the closest matching intra-coded frame; and
  - the processor is further configured to compute an average magnitude of displacement per macro-block based on the displacement magnitudes associated with the plurality of macro-blocks of the first inter-coded frame.

14. A system according to claim 13, wherein:
the processor is further configured to determine if the displacement magnitude associated with each of the plurality of macro-blocks equals less than a threshold, to compute a value corresponding to run lengths of those of the plurality of macro-blocks of each of the inter-coded frames determined to have the associated displacement magnitude equaling less than the threshold, and to identify the first inter-coded frame further based on the computed value corresponding to the run lengths of macro-blocks associated with the first inter-coded frame.

15. A system according to claim 14, wherein:
the processor is further configured to categorize each of the run lengths in one of a plurality of categories, each of the plurality of categories corresponds to a different run length range, and to compute a number of run lengths of macro-blocks associated with each of the inter-coded frames within each of the plurality of categories; and the computed value corresponding to the run lengths of macro-blocks associated with the first inter-coded frame is the computed number of run lengths of macro-blocks associated with the first inter-coded frame in one of the plurality of categories.

16. A system according to claim 15, wherein:
the processor is further configured to combine the computed average displacement magnitude and the computed number of run lengths for the inter-coded frame, and to identify the first inter-coded frame based on the combined displacement magnitude and number of run lengths.

17. A system according to claim 13, wherein:
the first inter-coded frame includes a plurality of macro-blocks;
each of the macro-blocks is associated with a respective portion of the bits associated with the first inter-coded frame in the stored compressed bit-stream which represents a magnitude of displacement from the associated macro-block to the closest matching intra-coded frame; and
the processor is further configured to determine an average displacement magnitude per macro-block based on the displacement magnitudes associated with the plurality of macro-blocks of the first inter-coded frame, to determine if the displacement magnitude associated with each of the plurality of macro-blocks equals less than a threshold, to compute a value corresponding to run lengths for those of the plurality of macro-blocks which are determined to have the associated displacement magnitude equaling less than the threshold, and to identify the first inter-coded frame further based on the computed value.

18. A system according to claim 13, wherein:
the sequence includes shots formed of respective series of adjacent ones of the inter-coded frames;
a first of the shots is formed of a first of the series of adjacent inter-coded frames which includes the first inter-coded frame;
each of the first series of adjacent inter-coded frames includes a plurality of macro-blocks;
each of the plurality of macro-blocks is associated with a respective portion of the bits associated with its inter-coded frame in the stored compressed bit-stream which represents a magnitude of displacement from the associated macro-block to the closest matching intra-coded frame; and
the processor is further configured to compute an average displacement magnitude per macro-block for each of the first series of adjacent inter-coded frames based on the displacement magnitudes of the plurality of macro-blocks of that inter-coded frame, to compute an average displacement magnitude per frame for the first shot based on the computed average displacement magnitudes per macro-block of the first series of inter-coded frames forming the first shot, and to select the first inter-coded frame to represent the first shot based on one of (i) a comparison the computed average displacement magnitude per macro-block of each of the first series of adjacent inter-coded frames with the computed average displacement magnitude per frame and (ii) the computed average displacement magnitude per frame.

19. A system for identifying a frame, comprising:
a memory configured to store a compressed bit-stream corresponding to a sequence of intra-coded and inter-coded frames, each of the inter-coded frames having a plurality of macro-blocks, the compressed bit-stream including bits, associated with each of the inter-coded frames, representing (i) a magnitude of the displacement of the associated inter-coded frame to a closest matching of the intra-coded frames and (ii) a number of run lengths of those of the plurality of macro-blocks of the associated inter-coded frame having a displacement magnitude to the closest matching intra-coded frame equaling less than a threshold; and
the processor configured to identify a first of the inter-coded frames based on the displacement magnitude of the first inter-coded frame and the number of run lengths of macro-blocks associated with the first inter-coded frame.

20. A system according to claim 19, wherein:
the number of run lengths is one of multiple numbers of run lengths of those of the plurality of macro-blocks of the associated inter-coded frame having the displacement magnitude to the closest matching intra-coded frame equaling less than a threshold;
each of the different numbers of run lengths is associated with one of a plurality of categories, each of the plurality of categories being associated with a different run length range; and
the processor is further configured to identify the first inter-coded frame based on the number of run lengths in each of the plurality of categories.

21. A system according to claim 19, wherein:
the processor is further configured to combine the displacement magnitude and the number of run lengths of macro-blocks associated with the first inter-coded frame, and to identify the first inter-coded frame based on the combined displacement magnitude and number of run lengths.

* * * * *